United States Patent
Chen

(10) Patent No.: US 12,537,687 B2
(45) Date of Patent: Jan. 27, 2026

(54) BLOCKCHAIN-BASED DATA PROCESSING METHOD AND APPARATUS, DEVICE, AND READABLE STORAGE MEDIUM

(71) Applicant: TENCENT TECHNOLOGY (SHENZHEN) COMPANY LIMITED, Shenzhen (CN)

(72) Inventor: Zimin Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 152 days.

(21) Appl. No.: 18/484,749

(22) Filed: Oct. 11, 2023

(65) Prior Publication Data

US 2024/0039727 A1    Feb. 1, 2024

Related U.S. Application Data

(63) Continuation of application No. PCT/CN2022/131296, filed on Nov. 11, 2022.

(30) Foreign Application Priority Data

Jan. 17, 2022   (CN) .......................... 202210047963.1

(51) Int. Cl.
*H04L 9/32*       (2006.01)
*H04L 9/00*       (2022.01)

(52) U.S. Cl.
CPC .............. *H04L 9/3218* (2013.01); *H04L 9/50* (2022.05)

(58) Field of Classification Search
CPC ................................ H04L 9/3218; H04L 9/50
See application file for complete search history.

(56) References Cited

U.S. PATENT DOCUMENTS 12,273,438 B2 *   4/2025   Fletcher ............... G06Q 20/389
2016/0330034 A1 * 11/2016  Back ..................... G06Q 20/065
(Continued)

FOREIGN PATENT DOCUMENTS

CN          109508968 A        3/2019
CN          111523150 A        8/2020
(Continued)

OTHER PUBLICATIONS

The World Intellectual Property Organization (WIPO) International Search Report for PCT/CN2022/131296 Jan. 18, 2023 12 Pages (including translation).

*Primary Examiner* — Hieu T Hoang
(74) *Attorney, Agent, or Firm* — Anova Law Group, PLLC

(57) ABSTRACT

A data processing method includes executing, by a relay node belonging to a sub-blockchain network, transaction data for a target sub-chain account to obtain a transaction execution result, obtaining total account status data in the sub-blockchain network that includes status data of at least two sub-chain accounts including the target sub-chain account, generating candidate total account status data that includes data obtained by modifying the status data of the target sub-chain account in the total account status data according to the transaction execution result, generating zero-knowledge proof data using a preset zero-knowledge proof circuit according to the total account status data and the candidate total account status data, and committing the zero-knowledge proof data and status change information associated with the transaction execution result to a main chain node belonging to a main blockchain network. The target sub-chain account is associated with a target main chain account.

20 Claims, 12 Drawing Sheets

(56) References Cited

U.S. PATENT DOCUMENTS

| | | | |
|---|---|---|---|
| 2019/0215159 A1* | 7/2019 | Notani | H04L 9/3297 |
| 2020/0151712 A1* | 5/2020 | Felten | H04L 9/3247 |
| 2020/0202343 A1 | 6/2020 | Shi et al. | |
| 2020/0211011 A1* | 7/2020 | Anderson | G06Q 20/06 |
| 2021/0119785 A1* | 4/2021 | Ben-Reuven | H04L 9/3239 |
| 2021/0126792 A1* | 4/2021 | Lu | H04L 9/085 |
| 2021/0160252 A1* | 5/2021 | Qiu | H04L 67/565 |

FOREIGN PATENT DOCUMENTS

| | | | |
|---|---|---|---|
| CN | 113269543 A | * | 8/2021 |
| CN | 113660092 A | | 11/2021 |

\* cited by examiner

BLOCKCHAIN-BASED DATA PROCESSING METHOD AND APPARATUS, DEVICE, AND READABLE STORAGE MEDIUM

CROSS-REFERENCE TO RELATED APPLICATIONS

This application is a continuation of International Application No. PCT/CN2022/131296, filed on Nov. 11, 2022, which claims priority to Chinese Patent Application No. 202210047963.1, entitled "BLOCKCHAIN-BASED DATA PROCESSING METHOD AND APPARATUS, DEVICE, AND READABLE STORAGE MEDIUM" filed with the China National Intellectual Property Administration on Jan. 17, 2022, which are incorporated by reference in their entirety.

FIELD OF THE TECHNOLOGY

This application relates to the field of computer technologies, and in particular, to a blockchain-based data processing method and apparatus, a device, and a readable storage medium.

BACKGROUND OF THE DISCLOSURE

Blockchain employs computer technologies, such as distributed data storage, peer to peer transmission, consensus mechanisms, and encryption algorithms. Blockchain is mainly used for sorting data in chronological order, and encrypting the data into a ledger, such that the data cannot be tampered or forged, and the data may be verified, stored, and updated. Blockchain may also perform data encryption transmission, node identification, and secure access, and is an advanced distributed infrastructure. Due to its property of being non-tamperable and real, blockchain has many applications.

Digital products may circulate on blockchain via transactions, but a transaction per second (TPS) of the existing blockchain network is limited. Excessive transactions related to digital products can cause problems such as long waiting time of on-chain transactions and slow transaction confirmation, and excessive transaction data needs to be stored on the blockchain, which will also lead to excessive storage pressure on the blockchain, thus causing the risk of data expansion on the blockchain.

SUMMARY

In accordance with the disclosure, there is provided a blockchain-based data processing method including executing, by a relay node belonging to a sub-blockchain network, transaction data for a target sub-chain account to obtain a transaction execution result, obtaining total account status data in the sub-blockchain network that includes status data of at least two sub-chain accounts including the target sub-chain account, generating candidate total account status data that includes data obtained by modifying the status data of the target sub-chain account in the total account status data according to the transaction execution result, generating zero-knowledge proof data using a preset zero-knowledge proof circuit according to the total account status data and the candidate total account status data, and committing the zero-knowledge proof data and status change information associated with the transaction execution result to a main chain node, to enable the main chain node to change status data of a target main chain account according to the status change information in response to the zero-knowledge proof data being proved and verified. The target sub-chain account is associated with the target main chain account, and the main chain node belongs to a main blockchain network.

Also in accordance with the disclosure, there is provided a computer device including one or more processors and one or more memories storing one or more computer programs that, when executed by the one or more processors, cause the one or more processors to execute transaction data for a target sub-chain account to obtain a transaction execution result, obtain total account status data in a sub-blockchain network that includes status data of at least two sub-chain accounts including the target sub-chain account, generate candidate total account status data that includes data obtained by modifying the status data of the target sub-chain account in the total account status data according to the transaction execution result, generate zero-knowledge proof data using a preset zero-knowledge proof circuit according to the total account status data and the candidate total account status data, and commit the zero-knowledge proof data and status change information associated with the transaction execution result to a main chain node, to enable the main chain node to change status data of a target main chain account according to the status change information in response to the zero-knowledge proof data being proved and verified. The target sub-chain account is associated with the target main chain account, and the main chain node belongs to a main blockchain network.

Also in accordance with the disclosure, there is provided a blockchain-based data processing method including receiving, by a main chain node belonging to a main blockchain network, zero-knowledge proof data and status change information associated with a transaction execution result that relate to a target sub-chain account and are committed by a relay node belonging to a sub-blockchain network, invoking a proof contract to prove and verify the zero-knowledge proof data to obtain a proof and verification result, and changing status data of a target main chain account according to the status change information in response to the proof and verification result indicating the zero-knowledge proof data is successfully proved and verified. The target sub-chain account is associated with the target main chain account.

BRIEF DESCRIPTION OF THE DRAWINGS

To describe the technical solutions in the embodiments of this application more clearly, the following briefly introduces the accompanying drawings for describing the embodiments. Apparently, the accompanying drawings in the following description show merely some embodiments of this application, and a person of ordinary skill in the art may still derive other drawings from the accompanying drawings without creative efforts.

DESCRIPTION OF EMBODIMENTS

The technical solutions in embodiments of this application are clearly and completely described in the following with reference to the accompanying drawings in the embodiments of this application. Apparently, the described embodiments are merely some rather than all of the embodiments of this application. Based on the embodiments in this application, all the other embodiments obtained by a person of ordinary skill in the art without involving any inventive effort fall within the scope of protection of this application.

Figure 1:
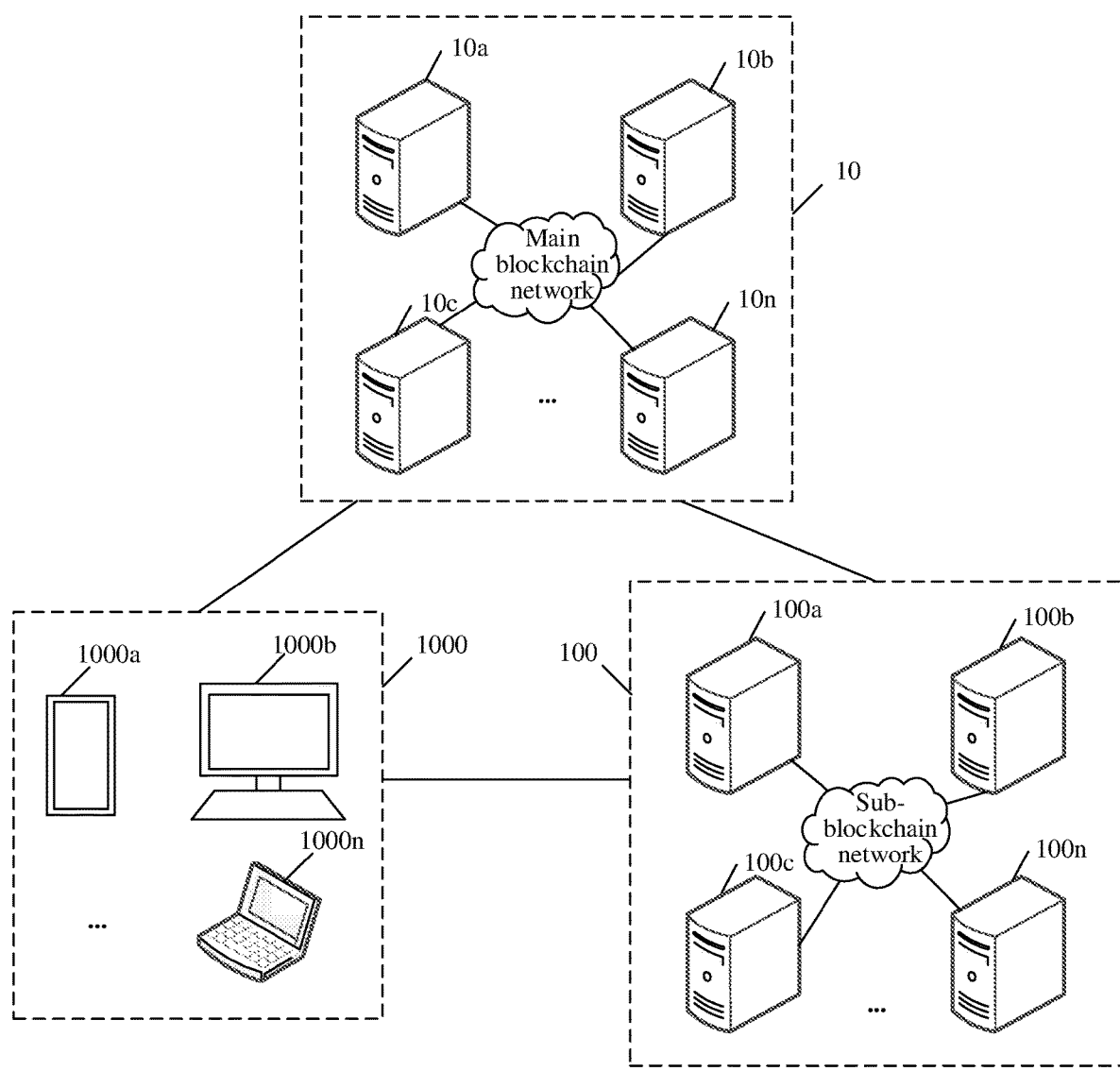
FIG. 1 is a schematic diagram of a network architecture according to an embodiment of this application.

Reference is made to FIG. 1. FIG. 1 is a schematic diagram of a network architecture according to an embodiment of this application. Blockchain is a novel application mode of a computer technology, such as distributed data storage, peer to peer transmission, consensus mechanisms, and encryption algorithms. The blockchain is mainly used for sorting data in chronological order, and encrypting the data into a ledger, whereby the data cannot be tampered and forged, and the data may be verified, stored, and updated. The blockchain is essentially a decentralized database in which each node stores an identical blockchain. A blockchain network may divide the nodes into consensus nodes and service nodes. The consensus nodes are responsible for the consensus of the whole blockchain network. The process of writing transaction data into the ledger in the blockchain network may be as follows. A client transmits transaction data to the service nodes, and then the transaction data is transferred between the service nodes in the blockchain network in a relay baton manner until a consensus node receives the transaction data. The consensus node packages the transaction data into a block to reach consensus with the other consensus nodes. After the consensus is reached, the block carrying the transaction data is written into the ledger.

It is to be understood that a block is a data packet carrying transaction data (namely, transaction services) on the blockchain network, and is a data structure marked with a timestamp and a hash value of the previous block. The block is verified by a consensus mechanism of the network, and the transaction in the block is determined.

It is to be understood that the hash value, also known as an information feature value or a feature value, is generated by converting input data of any length into passwords by a hashing algorithm and performing fixed output. Original input data cannot be retrieved by decrypting the hash value, and the hash value is a one-way encryption function. In the blockchain, each block (except an initial block) contains the hash value of the previous block, which is called a parent block of the current block. The hash value is the potential core foundation and the most important aspect of the blockchain technology, which retains the reality of recording and viewing data and the integrity of the blockchain as a whole.

It is to be understood that the blockchain system may include a smart contract. The smart contract may be understood as a code that may be understood and executed by each node (including the consensus node) of a blockchain in the blockchain system, and may execute any logic and obtain a result. A user may invoke the smart contract deployed on the blockchain by initiating a transaction service request from the client. Then the service nodes on the blockchain may transmit the transaction service request to the consensus nodes, and each consensus node on the blockchain may run the smart contract respectively. It is to be understood that the blockchain may include one or more smart contracts. These smart contracts may be differentiated by an identity document (ID) or a name. In the transaction service request initiated by the client, the ID or name of the smart contract may also be carried, thereby specifying a smart contract required to be run by the blockchain. If the smart contract specified by the client is a contract that needs to read data, each consensus node will access a local ledger to read the data. Finally, the consensus nodes will mutually verify whether execution results are consistent (namely, perform consensus). If yes, the execution results may be stored in the respective local ledgers, and the execution results may be returned to the client.

As shown in FIG. 1, the network architecture may include a main chain node cluster 10, a sub-chain node cluster 100, and a terminal device (client) cluster 1000. The main chain node cluster 10 may include a plurality of main chain nodes. The sub-chain node cluster may include a plurality of sub-chain nodes. As shown in FIG. 1, the main chain node cluster 10 may include a main chain node 10*a*, a main chain node 10*b*, a main chain node 10*c*, . . . , a main chain node 10*n*. The sub-chain node cluster 100 may specifically include a sub-chain node 100*a*, a sub-chain node 100*b*, a sub-chain node 100*c*, . . . , a sub-chain node 100*n*. The terminal device cluster 1000 may specifically include a terminal device 1000*a*, a terminal device 1000*b*, . . . , a terminal device 1000*n*.

There may be a data connection between the main chain nodes, thereby ensuring data intercommunication among the main chain nodes. For example, there is a data connection between the main chain node 10*a* and the main chain node 10*b*, and there is a data connection between the main chain node 10*a* and the main chain node 10*c*. Similarly, there may be a data connection between the sub-chain nodes, thereby ensuring data intercommunication among the sub-chain nodes. For example, there is a data connection between the sub-chain node 100*a* and the sub-chain node 10*b*, and there is a data connection between the sub-chain node 10*a* and the sub-chain node 10*c*. In addition, each main chain node in the main chain node cluster or each sub-chain node in the sub-chain node cluster may receive data transmitted by the terminal device cluster 1000 during normal operation and perform block uploading based on the received data, or may transmit data to the terminal device cluster 1000. That is, any main chain node in the main chain node cluster 10 may have a data connection with any sub-chain node in the sub-chain node cluster 100. Any main chain node in the main chain node cluster 10 may also have a data connection with any terminal device in the terminal device cluster 1000. Any sub-chain node in the sub-chain node cluster 100 may also have a data connection with any terminal device in the terminal device cluster 1000. For example, there are data connections between the terminal device 1000a, the main chain node 10a, and the sub-chain node 100a in pairs.

It is to be understood that the data connection is not limited to a connection mode, may be a direct or indirect connection by a wired communication mode, may be a direct or indirect connection by a wireless communication mode, and may also be other connection modes. This application is not limited thereto.

It is to be understood that a data processing method provided by embodiments of the application may be performed by a computer device. The computer device includes, but is not limited to, the main chain nodes (which may be terminals or servers), the sub-chain nodes (which may be terminals or servers), and the terminal devices. The server may be an independent physical server, a server cluster or a distributed system composed of a plurality of physical servers, or a cloud server providing basic cloud computing services, such as a cloud service, a cloud database, cloud computing, a cloud function, cloud storage, a network service, cloud communication, a middleware service, a domain name service, a security service, a CDN, and big data and artificial intelligence platforms. The terminal may be a smartphone, a tablet computer, a notebook computer, a desktop computer, a smart speaker, a smartwatch, or the like, but is not limited thereto.

It is to be understood that embodiments of the application may be applied to various scenarios, including but not limited to cloud technology, artificial intelligence, intelligent transportation, assisted driving, and the like.

As shown in FIG. 1, the main chain node cluster 10 constitutes a main blockchain network. All the main chain nodes in the main chain node cluster 10 store the same main blockchain. All the blocks generated in the main blockchain network will be uploaded to the main blockchain after consensus. It is to be understood that not all participating nodes in the blockchain have enough resources and necessity to become consensus nodes of the blockchain. Therefore, some main chain nodes in the main chain node cluster 10 may participate in the consensus of the block as consensus nodes. For example, the main chain node 10a, the main chain node 10c, ..., the main chain node 10n are consensus nodes, performing consensus on blocks (including a batch of transactions) of the main blockchain, including generating blocks and voting on blocks. Non-consensus nodes do not participate in consensus, but assist in spreading blocks and voting messages, and synchronizing with each other. Similarly, the sub-chain node cluster 100 constitutes a sub-blockchain network. All the sub-chain nodes in the sub-chain node cluster 100 store the same sub-blockchain. All the blocks generated in the sub-blockchain network will be uploaded to the sub-blockchain after consensus. In the sub-chain node cluster 100, only some sub-chain nodes need to participate in the block consensus of the sub-blockchain as consensus nodes.

As shown in FIG. 1, the main blockchain in the main blockchain network may contain a plurality of main chain accounts. The main chain accounts may be bound to users and correspond to status data. The status data contains account balances and is used for characterizing virtual resources owned by the users bound to the main chain accounts in the main blockchain. The virtual resources refer to digital products that use a digital form to express assets owned by the users in reality (for example, game equipment) and use an encryption technology to ensure security. In the digital product transaction scenario, more transactions may be generated at the same time in the main blockchain network in correspondence to more main chain accounts. However, the overall performance of the main blockchain network is limited. At this moment, the waiting time of transactions will be too long, and data generated by transactions will also be stored in the main blockchain network, which will easily cause the data expansion of the main blockchain network. Therefore, the transactions for the main chain account in the main blockchain network may be transferred to the sub-blockchain network for execution, and the transactions are executed in batches in the sub-blockchain network. Only one transaction containing status change information corresponding to the transactions needs to be executed in the main blockchain network, and relevant data of the transactions does not need to be uploaded to the main blockchain network, but is stored in the sub-blockchain network, thus solving the problems of insufficient TPS and overload of data storage in the main blockchain network under the digital product transaction scenario.

Figure 2A:
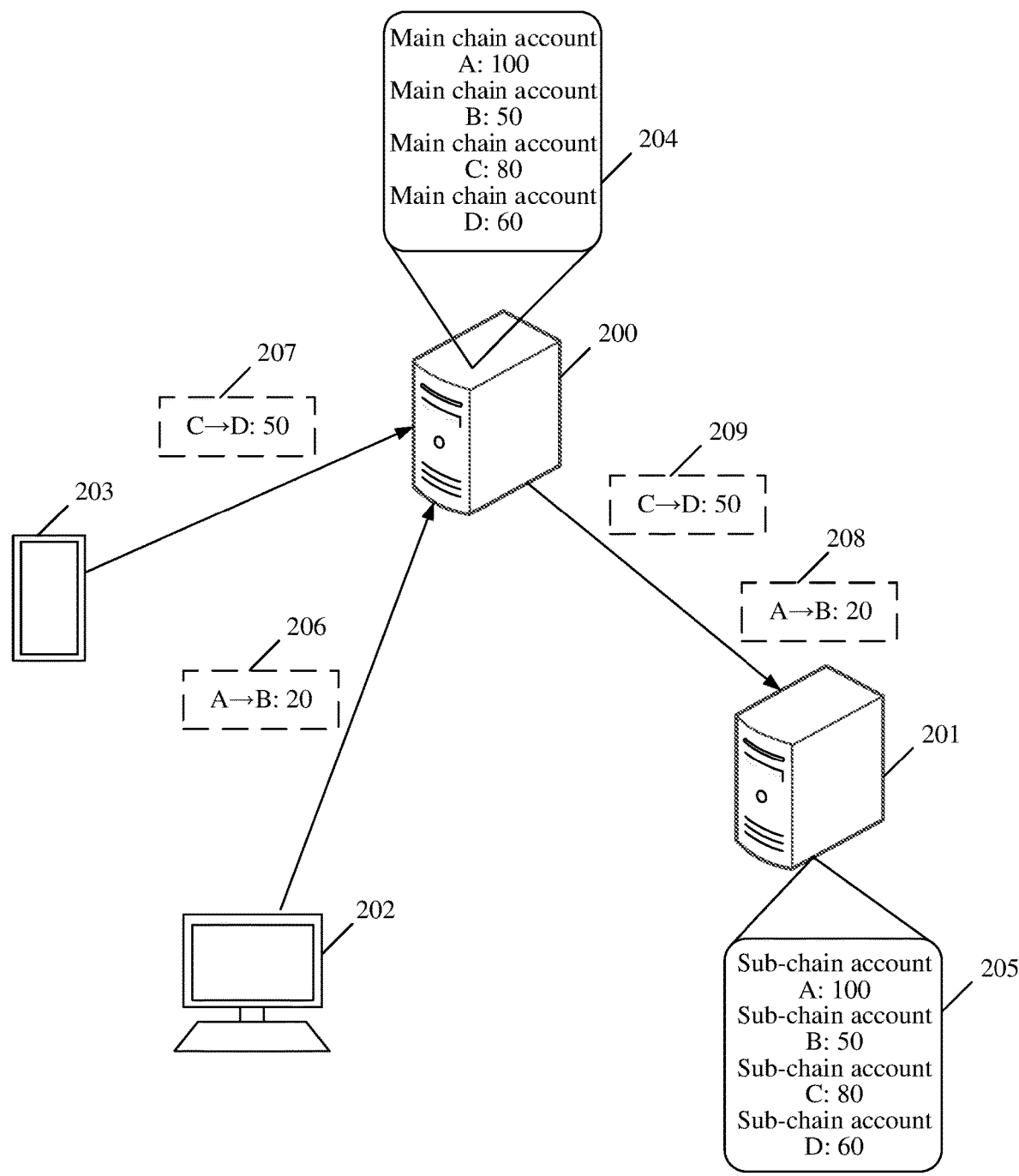
FIG. 2A to FIG. 2B are schematic diagrams showing a blockchain-based data processing scenario according to an embodiment of this application.
Figure 2B:
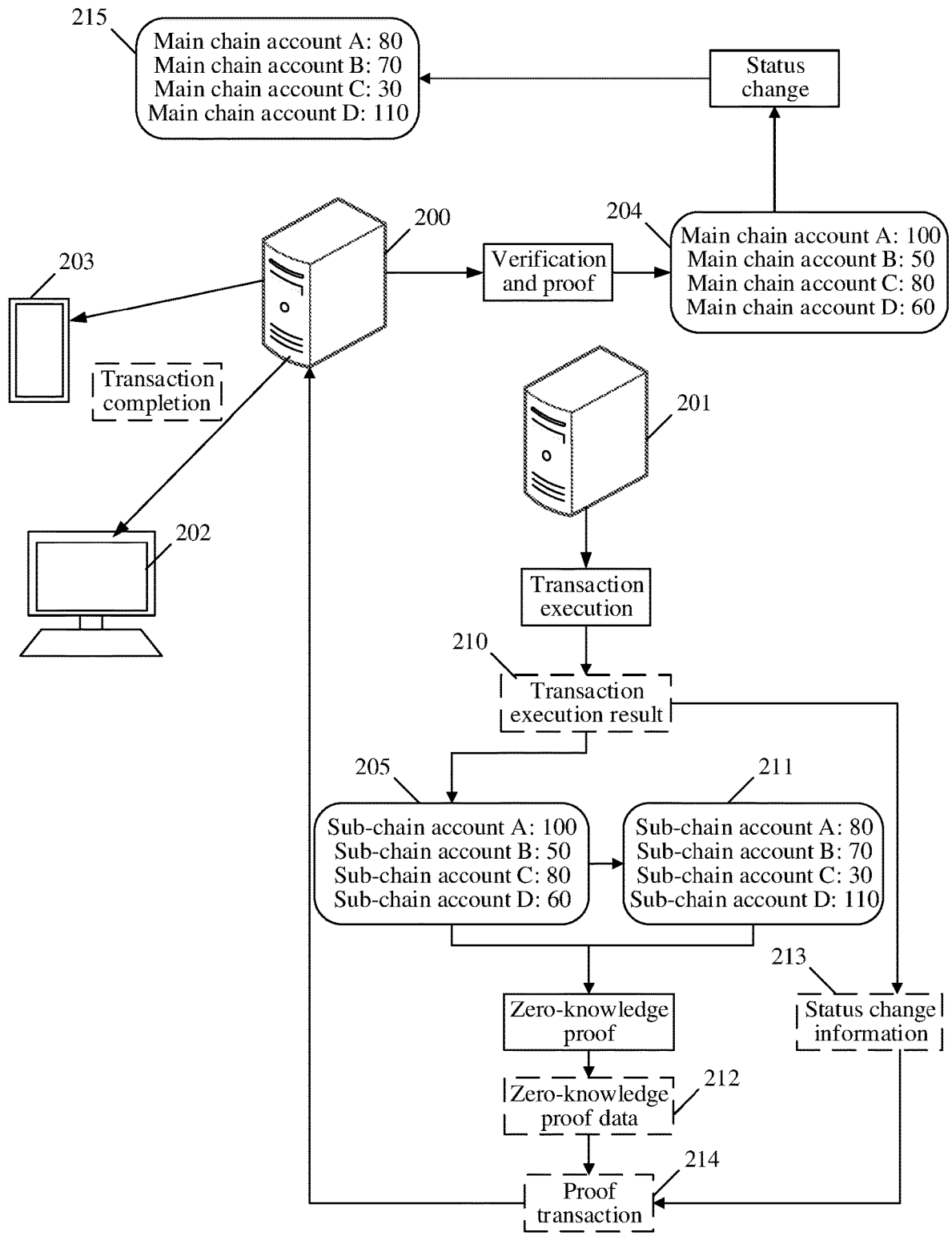

The transactions for the main chain account in the main blockchain network are transferred to the sub-blockchain network for execution. A batch of transactions are executed in the sub-blockchain network. Then for the specific implementation process of only executing a transaction containing status change information corresponding to the batch of transactions in the main blockchain network, reference is made to FIG. 2A to FIG. 2B. FIG. 2A to FIG. 2B are schematic diagrams showing a blockchain-based data processing scenario according to an embodiment of this application. A main chain node 200 shown in FIG. 2A may be any main chain node in the main chain node cluster 10 in the embodiment corresponding to FIG. 1. For example, the main chain node 200 may be the main chain node 10a. A relay node 201 shown in FIG. 2A may be any sub-chain node in the sub-chain node cluster 100 in the embodiment corresponding to FIG. 1. For example, the relay node 201 may be the sub-chain node 100a. A terminal device 202 and a terminal device 203 shown in FIG. 2A may be any two terminal devices in the terminal device cluster 1000 in the embodiment corresponding to FIG. 1. For example, the terminal device 202 may be the terminal device 1000b, and the terminal device 203 may be the terminal device 1000a.

As shown in FIG. 2A, total contract status data 204 is stored in the main chain node 200. The total contract status data 204 includes contract status data corresponding to each main chain account in the main blockchain network to which the main chain node belongs. The contract status data contains a contract balance, which is used for characterizing virtual resources corresponding to the main chain account in an asset locking contract in the main blockchain. From the total contract status data 204, it can be seen that the contract balance of a main chain account A in the main blockchain network is 100. The contract balance of the main chain account B is 50. The contract balance of the main chain account C is 80. The contract balance of the main chain account D is 60. In this application, the main chain account in the main blockchain network may be associated with the sub-chain account in the sub-blockchain network, and the contract status data corresponding to the virtual resources stored in the asset locking contract of the main chain account should be consistent with the status data of the associated sub-chain account. For example, if a sub-chain account A is associated with the main chain account A, the account balance of the sub-chain account A should be 100 at this moment. If a sub-chain account B is associated with the main chain account B, the account balance of the sub-chain account B should be 50 at this moment. If a sub-chain account C is associated with the main chain account C, the account balance of the sub-chain account C should be 80 at this moment. If a sub-chain account D is associated with the main chain account D, the account balance of the sub-chain account D should be 60 at this moment. Total account status data 205 stored in the relay node 201 may include status data corresponding to each sub-chain account. As shown in FIG. 2A, it is assumed that the terminal device 202 initiates, to the main chain node 200, a transaction 206 of transferring 20 from the main chain account A to the main chain account B and the terminal device 203 initiates, to the main chain node 200, a transaction 207 of transferring 50 from the main chain account C to the main chain account D in the same time period. The main chain node 200 may simply verify the validity of the transaction 206 after receiving the transaction 206, for example, whether the contract balance of the main chain account A is greater than 20. If the transaction 206 is verified to be valid, the main chain node 200 may initiate, to the relay node 201, a transaction 208 of transferring 20 from the sub-chain account A to the sub-chain account B according to the transaction 206. Similarly, the main chain node 200 may also initiate, to the relay node 202, a transaction 209 of transferring 50 from the sub-chain account C to the sub-chain account D based on the transaction 207. It is to be understood that since the account balance of the sub-chain account is consistent with the contract balance of the main chain account, the account balance change of the sub-chain account after the relay node 201 executes the transaction 208 and the transaction 209 and the contract balance change of the main chain account after the main chain node 200 executes the transaction 206 and the transaction 207 shall also be consistent. Therefore, when the main chain node 200 in the main blockchain network receives a transaction for the virtual resources stored in the asset locking contract of the target main chain account, the transaction may be converted into a transaction for the target sub-chain account associated with the target main chain account. Then the transaction for the target sub-chain account is transmitted to the relay node 201, and the sub-blockchain network completes the transaction execution and uploading. After the relay node 201 executes the transaction, status change information is generated according to an execution result of the transaction, and the status change information is returned to the main chain node 200. The main chain node 200 may directly change the total contract status data 204 according to the status change information without executing the transaction.

However, for the security and rigor of data, the main chain node 200 shall confirm that the relay node 201 has actually executed the transaction 208 and the transaction 209, and then changed the total contract status data 204 according to the status change information. As shown in FIG. 2B, the relay node 201 may execute transactions obtained within a target time period in batches. Here, the relay node 201 only executes, for example, the transaction 208 and the transaction 209. In fact, the relay node 201 may receive a plurality of transactions transmitted by a plurality of main chain nodes within the target time period, and then execute all transactions. After executing the transactions, the relay node 201 may obtain a transaction execution result 210, and obtain to-be-verified total account status data 211 according to the transaction execution result 210 and the total account status data 205. It is to be understood that the transaction 208, the transaction 209, and the corresponding transaction execution results 210 have not been uploaded by consensus in the sub-blockchain network at this moment. Therefore, the total account status data 205 in the sub-blockchain network has not been actually changed at this moment. After the relay node 201 obtains the total account status data 205 and the to-be-verified total account status data 211, a zero-knowledge proof may be generated based on the total account status data 205 and the to-be-verified total account status data 211 to obtain zero-knowledge proof data for proving that both the transaction 208 and the transaction 209 are executed correctly. The zero-knowledge proof means that a verifier believes that a certain assertion is correct when a prover does not provide any useful information to the verifier. The relay node 201 may generate the zero-knowledge proof data that does not disclose the specific execution process of the transaction, but may prove that the transaction is indeed executed correctly through a zero-knowledge proof circuit. The main chain node 200 may determine whether the relay node 201 has successfully executed this batch of transactions only by verifying whether the zero-knowledge proof data has passed. As shown in FIG. 2B, the relay node 201 may constitute a proof transaction 214 by zero-knowledge proof data 212 corresponding to this batch of transactions (namely, the transaction 208 and the transaction 209) and status change information 213 corresponding to this batch of transactions, and commit the proof transaction to the main chain node 200. The status change information 213 only needs to include reduced transaction execution result information corresponding to the transaction execution. For example, the status change information 213 is: The contract balance of the main chain account A is 80, the contract balance of the main chain account B is 70, the contract balance of the main chain account C is 30, and the contract balance of the main chain account D is 110. After receiving the proof transaction 214, the main chain node 200 may invoke a proof contract to verify the zero-knowledge proof data in the proof transaction 214. After the verification is successful, the main chain node 200 may change the total contract status data 204 according to the status change information to obtain changed total contract status data 215. In addition, the relay node may be used as a block generation node in the sub-blockchain network. This batch of transactions are packaged into blocks, and then the blocks are transmitted to other sub-chain consensus nodes in the sub-chain node cluster for consensus. After the consensus is reached, this batch of transactions and the corresponding transaction execution results will be written into the ledger of the sub-blockchain network. At this moment, the total account status data 205 of the sub-blockchain network is changed to the to-be-verified total account status data 211. It is to be understood that the account balance of the changed sub-chain account is consistent with the contract balance of the changed main chain account.

It is to be understood that data relevant to transaction data, status data, and the like is involved in the detailed description of the embodiments. When the above embodiments of this application are applied to a particular product or technology, user approval or consent is required, and collection, use and processing of the relevant data is required to comply with relevant national and regional laws and regulations and standards.

According to the data processing method provided by embodiments of the application, a plurality of transactions in a main blockchain network may be executed in a sub-blockchain network. The main blockchain network only needs to perform consensus uploading on a proof transaction containing zero-knowledge proof data and status change information corresponding to the plurality of transactions, thus greatly improving the TPS of the main blockchain and relieving the storage pressure of the main blockchain.

Figure 3:
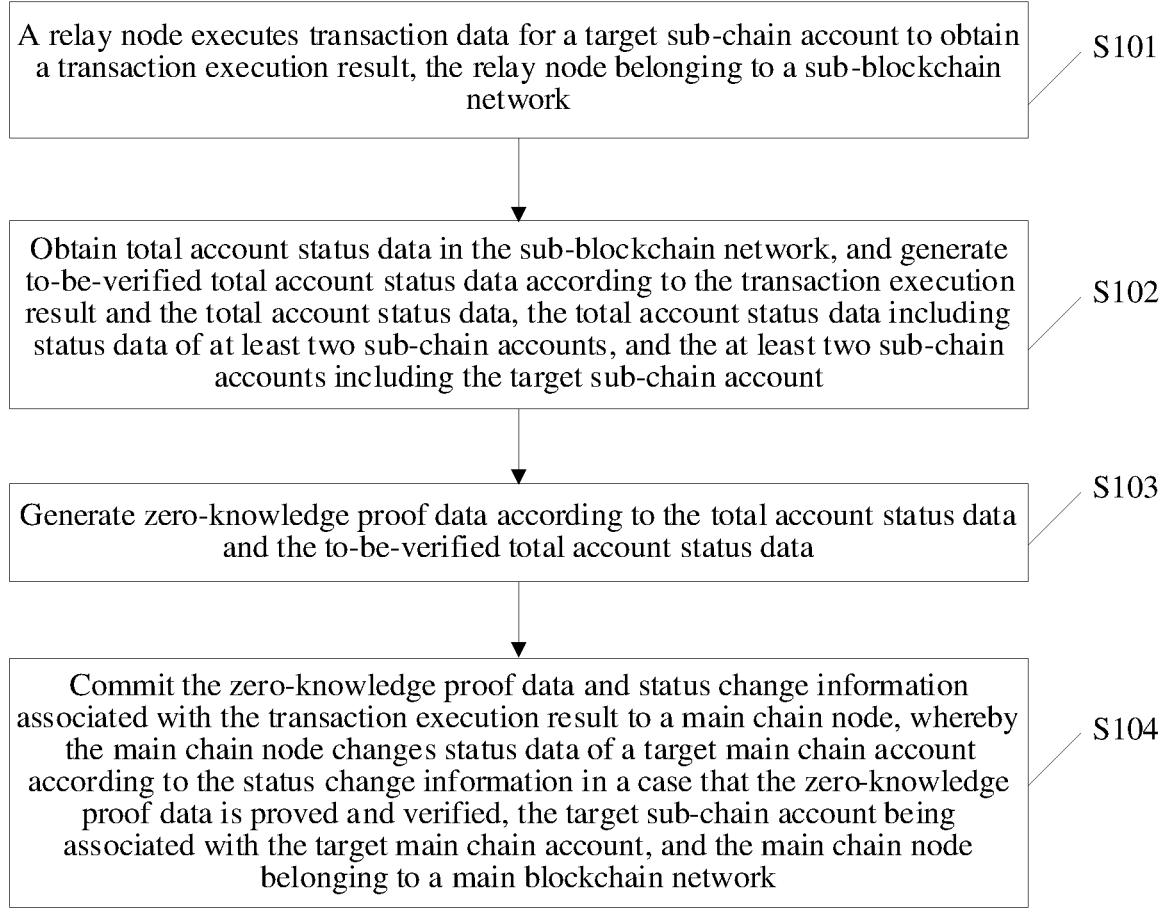
FIG. 3 is a schematic flowchart of a blockchain-based data processing method according to an embodiment of this application.

Reference is made to FIG. 3. FIG. 3 is a schematic flowchart of a blockchain-based data processing method according to an embodiment of this application. The method may be performed by a computer device such as a computer device implementing the functions of a relay node (for example, any sub-chain node in the sub-chain node cluster 100 in the embodiment corresponding to FIG. 1). The method will be performed by, for example, a relay node. The blockchain-based data processing method may at least include the following steps S101-S104.

Step S101: A relay node executes transaction data for a target sub-chain account to obtain a transaction execution result, the relay node belonging to a sub-blockchain network.

In some embodiments, the relay node may receive transaction data for the target sub-chain account from a main chain node or may directly receive transaction data for the target sub-chain account from a terminal device. The relay node may execute transaction data in batches, that is, package a plurality of transaction data received within a target time period into to-be-uploaded blocks. The relay node may execute the transaction data in batches to obtain a transaction execution result.

Step S102: Obtain total account status data in the sub-blockchain network, and generate to-be-verified total account status data (also referred to as a "candidate total account status data" that is to be verified) according to the transaction execution result and the total account status data, the total account status data including status data of at least two sub-chain accounts, and the at least two sub-chain accounts including the target sub-chain account.

In some embodiments, the status data of the sub-chain account refers to data of the sub-chain account stored in a sub-blockchain, and the status data includes an account balance for characterizing virtual resources owned by the sub-chain account in the sub-blockchain network. The status data of all sub-chain accounts in the sub-blockchain network constitutes the total account status data in the sub-blockchain network. When the transaction data for the target sub-chain account in the sub-blockchain network is executed, the status data of the target sub-chain account needs to be changed, and correspondingly, the total account status data in the sub-blockchain network also needs to be changed. For example, the account balance of a sub-chain account a is 100, the account balance of a sub-chain account b is 50, and transaction 1 is transfer of 20 from the sub-chain account a to the sub-chain account b. After transaction 1 is completed, the account balance of the sub-chain account a needs to be changed to 80, and the account balance of the sub-chain account b needs to be changed to 70.

In some embodiments, virtual resources of different resource types may be stored in the sub-blockchain network. At this moment, virtual resources of different resource types owned by sub-chain accounts need to be characterized by different balances. For example, the status data of a sub-chain account c is "tokenX: 100, tokenY: 80," where tokenX is used for characterizing a virtual resource X with a resource type X, and tokenY is used for characterizing a virtual resource Y with a resource type Y. That is, the sub-chain account c has 100 virtual resources X and 80 virtual resources Y. In addition, different virtual resources cannot be superimposed, and the transaction of virtual resources of the same resource type may be performed between different sub-chain accounts. It is assumed that the status data of a sub-chain account d is "tokenX: 100, tokenY: 80" and transaction 2 is transfer of 50 virtual resources X from the sub-chain account c to the sub-chain account d. After transaction 2 is completed, the status data of the sub-chain account c needs to be changed to "tokenX: 50, tokenY: 80," and the status data of the sub-chain account d needs to be changed to "tokenX: 150, tokenY: 80."

In some embodiments, the to-be-verified total account status data may be obtained by modifying the status data of the target sub-chain account in the total account status data according to the transaction execution result. It is to be understood that before the transaction execution result is written into a ledger of the sub-blockchain network, the total account status data in the sub-blockchain network will not be changed. That is, after the transaction data is executed, the total account status data needs to be changed to the to-be-verified total account status data. When the transaction execution result is subsequently written into the ledger of the sub-blockchain network, the total account status data may be truly changed to the to-be-verified total account status data.

Step S103: Generate zero-knowledge proof data according to the total account status data and the to-be-verified total account status data.

In some embodiments, the transaction data for the virtual resources stored in the asset locking contract of the target main chain account is converted into the transaction data for the target sub-chain account associated with the target main chain account, and the sub-blockchain network executes the transaction data, thereby reducing the task amount of transaction execution in the main blockchain network. The relay node may generate zero-knowledge proof data according to the total account status data and the to-be-verified total account status data to prove that the transaction has been successfully executed. The zero-knowledge proof means that a prover proves to a verifier that the prover knows or owns a certain message, but the proof process cannot disclose any information about the proved message to the verifier. That is, the relay node may prove to the main chain node that the relay node has successfully executed the transaction through the zero-knowledge proof data, but does not disclose relevant information in the transaction execution process.

In some embodiments, a feasible process of generating zero-knowledge proof data according to the total account status data and the to-be-verified total account status data is: hashing the total account status data to obtain a first status hash value; hashing the to-be-verified total account status data to obtain a second status hash value; determining status data change values corresponding to the at least two sub-chain accounts according to the total account status data and the to-be-verified total account status data; and then inputting the first status hash value, the second status hash value, and the status data change values into the zero-knowledge proof circuit to obtain the zero-knowledge proof data. The zero-knowledge proof circuit is a circuit designed and compiled based on a calculation process to be proved. The relay node only needs to provide an input of the zero-knowledge proof circuit, and then may calculate corresponding zero-knowledge proof data according to the input of the zero-knowledge proof circuit. In this application, by inputting the first status hash value, the second status hash value, and the status data change values, which represent the process that the total account status data in the sub-blockchain network changes with the transaction execution result, into the zero-knowledge proof circuit, the zero-knowledge proof data which proves that the relay node really successfully executes the transaction may be obtained. Definitely, other input zero-knowledge proof circuits may also be used for proving that the relay node has successfully executed the transaction. Embodiments of the application are not limited thereto.

In some embodiments, a feasible process of hashing the total account status data to obtain a first status hash value is: performing a hash operation on the status data of the at least two sub-chain accounts in the total account status data to obtain account status hash values corresponding to the at least two sub-chain accounts respectively; and performing a hash operation on the account status hash values corresponding to the at least two sub-chain accounts respectively according to a status Merkle tree path to obtain a root hash value, and determining the root hash value as the first status hash value. In addition, the to-be-verified total account status data may be hashed similarly to obtain the second status hash value.

Step S104: Commit the zero-knowledge proof data and status change information associated with the transaction execution result to a main chain node, whereby the main chain node changes status data of a target main chain account according to the status change information in a case that the zero-knowledge proof data is proved and verified, the target sub-chain account being associated with the target main chain account, and the main chain node belonging to a main blockchain network.

In some embodiments, according to the corresponding embodiments of FIG. 2A and FIG. 2B, the sub-chain accounts in the sub-blockchain network are all associated with the main chain account in the main blockchain network. When the status data of the sub-chain account is consistent with the status data corresponding to the virtual resources stored in the asset locking contract of the main chain account, a status change for the target sub-chain account may be obtained after the relay node executes the transaction data and obtains the transaction execution result. The status change may be used as status change information for the target main chain account. The status change information is used for instructing the main chain node to change the status data corresponding to the virtual resources stored in the asset locking contract of the target main chain account. For example, the status change information may be "target main chain account, tokenX: 50," the main chain node may change a balance corresponding to the virtual resource X in the status data corresponding to the virtual resources stored in the asset locking contract of the target main chain account to 50 according to the status change information.

In some embodiments, the relay node may assemble the zero-knowledge proof data and the status change information into a transaction, and then commit the zero-knowledge proof data and the status change information to the main chain node in the main blockchain network in the form of the transaction. After the consensus of this transaction is reached, the main chain node may verify the zero-knowledge proof data. If the verification is successful, the status data corresponding to the virtual resources stored in the asset locking contract of the target main chain account will be changed according to the status change information.

In some embodiments, after the main chain node proves and verifies the zero-knowledge proof data, the relay node may perform consensus processing on a to-be-uploaded sub-chain block containing transaction data. After the consensus of the to-be-uploaded sub-chain block is reached (also referred to as the to-be-uploaded sub-chain block having reached consensus or the to-be-uploaded sub-chain block having passed the consensus processing), the relay node may write the transaction execution result corresponding to the transaction data into the ledger of the sub-blockchain network. At this moment, the total account status data in the ledger of the sub-blockchain network will be updated to the to-be-verified total account status data.

By adopting the method provided by embodiments of the application, transaction data corresponding to virtual resources stored in an asset locking contract for a target main chain account in a main blockchain network is converted into transaction data for a target sub-chain account associated with the target main chain account in a sub-blockchain network. After executing the transaction data for the target sub-chain account to obtain a transaction execution result, a relay node in the sub-blockchain network may obtain total account status data, generate to-be-verified total account status data according to the transaction execution result and the total account status data, and then generate zero-knowledge proof data according to the total account status data and the to-be-verified total account status data. The zero-knowledge proof data is used for proving that the transaction data is really executed. Finally, the relay node commits the zero-knowledge proof data and status change information to a main chain node. The main chain node may change status data of the target main chain account according to the status change information after verifying the zero-knowledge proof data. The main chain node does not need to execute a large amount of transaction data for the virtual resources stored in the asset locking contract or to store relevant data generated in the execution process, thus improving the TPS of the main blockchain network and relieving the data storage pressure of the main blockchain network.

Figure 4:
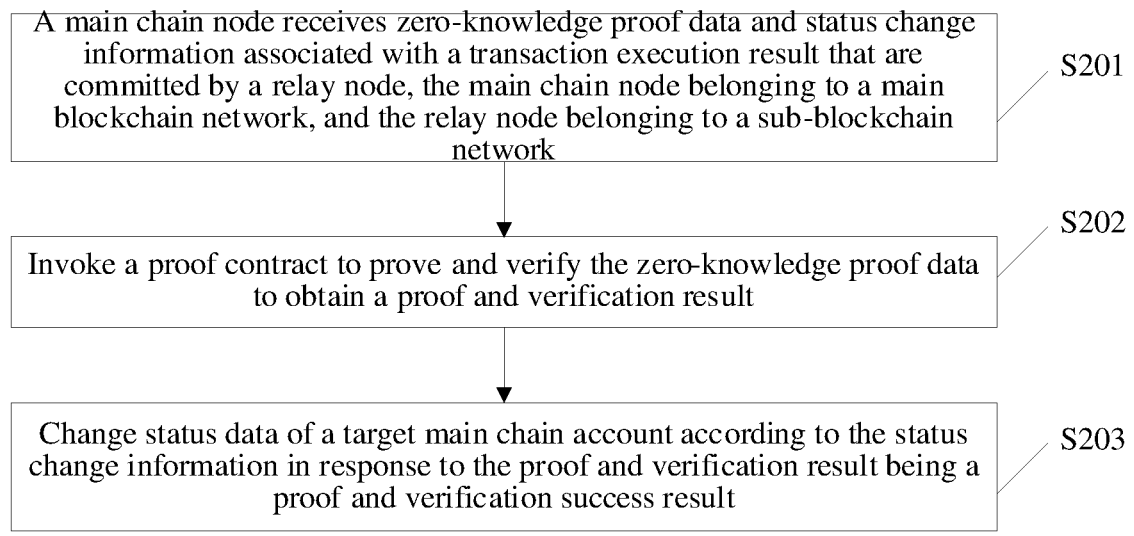
FIG. 4 is a schematic flowchart of another blockchain-based data processing method according to an embodiment of this application.

Reference is made to FIG. 4. FIG. 4 is a schematic flowchart of another blockchain-based data processing method according to an embodiment of this application. The method may be performed by a main chain node (for example, any main chain node in the main chain node cluster 10 in the embodiment corresponding to FIG. 1). The method will be performed by, for example, a main chain node. The blockchain-based data processing method may at least include the following steps S201-S203.

Step S201: A main chain node receives zero-knowledge proof data and status change information associated with a transaction execution result that are committed by a relay node, the main chain node belonging to a main blockchain network, and the relay node belonging to a sub-blockchain network.

In some embodiments, the zero-knowledge proof data is generated by the relay node according to total account status data of the sub-blockchain network and a to-be-verified total account status data. The to-be-verified total account status data is generated according to the transaction execution result and the total account status data, and the transaction execution result is obtained by executing transaction data for a target sub-chain account by the relay node. In addition, the target sub-chain account is associated with a target main chain account. For the specific generation process, reference may be made to step S103 in the embodiment corresponding to FIG. 3.

Step S202: Invoke a proof contract to prove and verify the zero-knowledge proof data to obtain a proof and verification result.

In some embodiments, the proof contract is determined based on a zero-knowledge proof circuit that generates the zero-knowledge proof data. A ZoKrates (a tool project) tool may be used for deriving the proof contract corresponding to the zero-knowledge proof circuit, and developers may also compile the zero-knowledge proof circuit through the ZoKrates tool. The proof contract is deployed in the main blockchain network, and the main chain node may invoke the proof contract to verify the zero-knowledge proof data, and then output the proof and verification result.

Step S203: Change status data of a target main chain account according to the status change information in response to the proof and verification result being a proof and verification success result, i.e., the zero-knowledge proof data is successfully proved and verified.

In some embodiments, in embodiments of the application, virtual resources of the target main chain account may be divided into on-chain virtual resources and contract virtual resources. The on-chain virtual resources refer to virtual resources owned by the target main chain account in the main blockchain network and not locked in a resource locking contract, and the contract virtual resources refer to virtual resources owned by the target main chain account in the main blockchain network and locked in the resource locking contract. In the main blockchain network, status data of the target main chain account may include on-chain status data and contract status data. The on-chain status data is used for characterizing the on-chain virtual resources owned by the target main chain account, and the contract status data is used for characterizing the contract virtual resources owned by the target main chain account. Thus, the virtual resources owned by the sub-chain account associated with the target main chain account in the sub-blockchain network only need to be consistent with the contract virtual resources of the target main chain account. That is, the total account status data of the sub-blockchain network only needs to be consistent with the contract status data of the target main chain account. That is, in the main blockchain network, the contract virtual resources stored in the resource locking contract will be locked, and the transaction data related to the contract virtual resources of the target main chain account will be converted into the transaction data related to the target sub-chain account. The execution process of the transaction data will be executed in the sub-blockchain network. Also, the transaction data for unlocked on-chain virtual resources of the target main chain account may be packaged into blocks by the main chain nodes with a block generation permission in the main blockchain network, and then uploaded by consensus.

In some embodiments, when the status data of the target main chain account includes on-chain status data and contract status data, that is, when the total contract status data corresponding to the contract virtual resources in the resource locking contract in the main blockchain network is consistent with the total account status data in the sub-blockchain network, a feasible implementation process of changing status data of a target main chain account according to the status change information is: changing statuses of the on-chain status data and the contract status data of the target main chain account according to the status change information in response to the transaction data belonging to a first transaction service type; and changing the status of the contract status data of the target main chain account according to the status change information in response to the transaction data belonging to a second transaction service type. The transaction data of the first transaction service type refers to transaction data involving the interaction between the on-chain virtual resources and the contract virtual resources of the main chain account. The transaction data is used for storing a first target amount of on-chain virtual resources into the resource locking contract, or extracting a second target amount of contract virtual resources from the resource locking contract and storing the resources in the ledger in the main blockchain network. The target amount of on-chain virtual resources stored in the resource locking contract will also be regarded as contract virtual resources, which may be considered as virtual resources stored in the sub-blockchain network from the main blockchain network, because the amount of virtual resources in the sub-blockchain network will be the same as the amount of contract virtual resources. The transaction data of the second transaction service type refers to the transaction data only for the contract virtual resources. At this moment, the total amount of contract virtual resources owned by all main chain accounts has not changed, and the total amount of virtual resources in the sub-blockchain network remains unchanged.

In some embodiments, when the first transaction service type is a storage service type, the status change information may include the target main chain account for executing a storage service and target storage status data. The process of changing statuses of the on-chain status data and the contract status data of the target main chain account according to the status change information in response to the transaction data belonging to a first transaction service type includes: obtaining a virtual resource corresponding to the target storage status data from the on-chain virtual resources corresponding to the target main chain account as a storage virtual resource in response to the transaction data belonging to the storage service type; transferring the storage virtual resource to the resource locking contract for locking; subtracting the target storage status data from the on-chain status data to obtain status-changed on-chain status data; and adding the contract status data and the target storage status data to obtain status-changed contract status data. For example, it is assumed that the main blockchain network contains a main chain account e, on-chain status data of the main chain account e is "tokenX: 20, tokenY: 50," contract status data of the main chain account e is "tokenX: 50, tokenY: 30," and the status change information is "main chain account e, store tokenX: 20." The main chain node will store 20 on-chain virtual resources X into the resource locking contract. At this moment, the number of contract virtual resources X stored in the resource locking contract is 70, the on-chain status data of the main chain account e will be changed to "tokenX: 0, tokenY: 50," and the contract status data of the main chain account e will be changed to "tokenX: 70, tokenY: 30."

Figure 5:
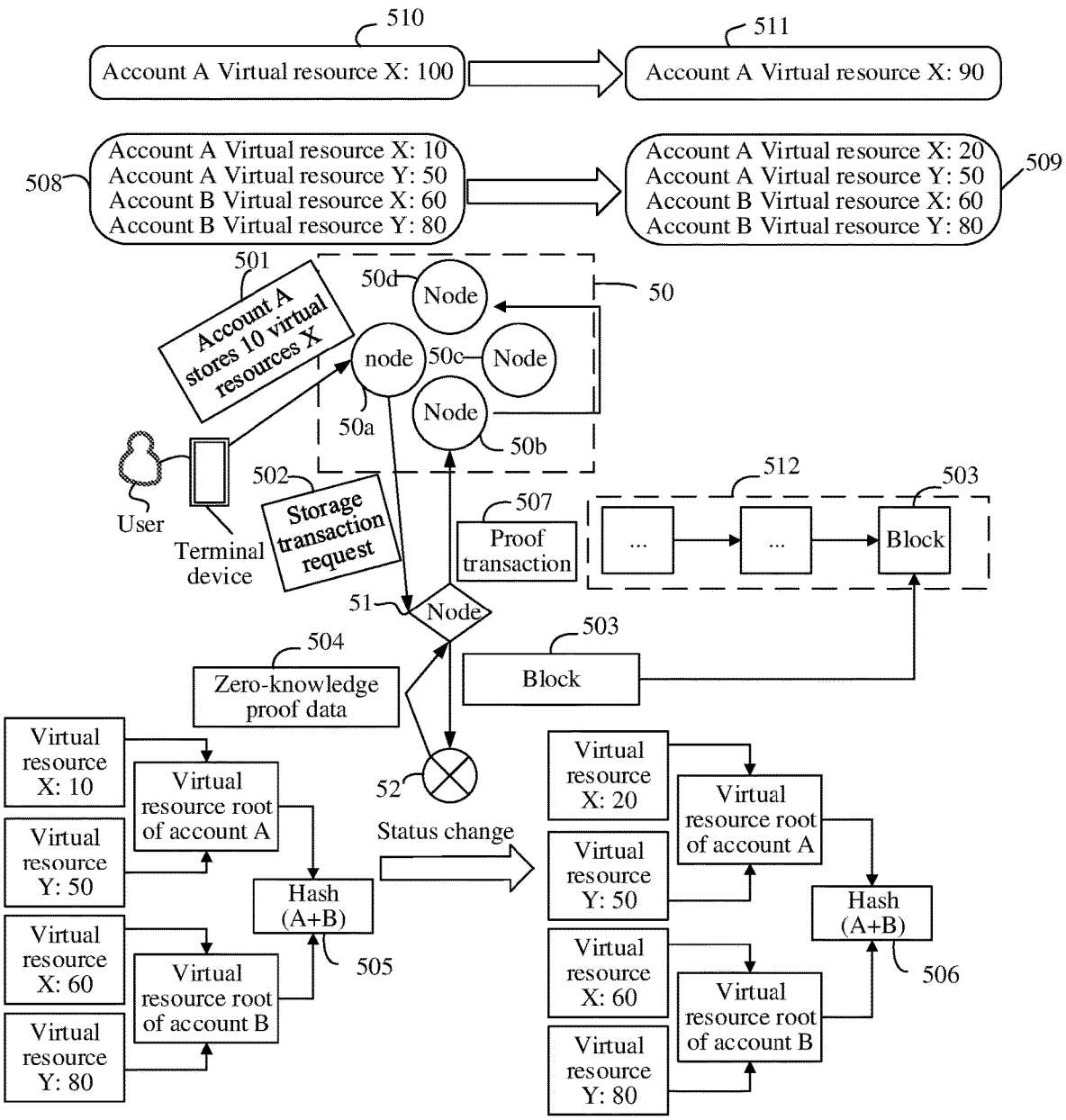
FIG. 5 is a schematic diagram showing a storage transaction processing scenario according to an embodiment of this application.

In order to better understand the processing procedure of a transaction of a storage service type, reference is made to FIG. 5 together. FIG. 5 is a schematic diagram showing a storage transaction processing scenario according to an embodiment of this application. The terminal device shown in FIG. 5 may be any terminal device in the terminal device cluster 1000 in the embodiment corresponding to FIG. 1. For example, the terminal device may be the terminal device 1000b. A main chain node cluster 50 shown in FIG. 5 may be the main chain node cluster 10 in the embodiment corresponding to FIG. 1. A relay node 51 shown in FIG. 5 may be any sub-chain node in the sub-chain node cluster 100 in the embodiment corresponding to FIG. 1. For example, the relay node 51 may be the sub-chain node 100a.

As shown in FIG. 5, a user may commit a storage transaction to a main chain through the bound terminal device. For example, the terminal device transmits a storage transaction 501 to a main chain node 50a. The transaction content of the storage transaction 501 is "account A stores 10 virtual resources X." That is, a user A wants to transfer virtual resources X on the main chain to a resource locking contract of the main chain.

to be stored for an off-chain transaction. At this moment, 10 virtual resources X will be waiting to be locked. Then the main chain may transmit a main chain user storage transaction request to a relay. For example, the main chain node 50a may transmit a storage transaction request 502 to the relay node 51. After receiving the storage transaction request 502, the relay node 502 may collect and package all the transaction requests within a target time period on the main chain. For example, a block 503 contains the storage transaction request 502. Also, the relay node 51 may input the block 503 into a zero-knowledge proof circuit 52 to generate zero-knowledge proof data 504. In some embodiments, the block 503 contains a transaction execution result corresponding to the transaction request, the relay node 503 may obtain status data of the sub-chain account, generate a first status hash value 505, obtain to-be-verified status data of the sub-chain account according to the transaction execution result, and generate a second status hash value 506. The relay node 503 may also determine a status data change value, namely a change value of the virtual resource X of the sub-chain account A, and input the first status hash value 505, the second status hash value 506, and the status data change value into the zero-knowledge proof circuit 52 to verify the correctness of the status transition process of all transactions in the block 503. If the input information conforms to the verification procedure of the zero-knowledge proof circuit, the zero-knowledge proof circuit may output the zero-knowledge proof data 504 for proving that the storage transaction request 502 is indeed executed. Then the relay node 51 may generate a proof transaction 507 containing the zero-knowledge proof data 504 and status change information to the main chain. Assuming that the relay node 51 commits the proof transaction 507 to the main chain node 50b, and then the main chain node 50b may initiate consensus uploading for the proof transaction 507 in the main chain. If the proof transaction 507 is consensus-reached, the main chain node 50b invokes a proof contract to verify the zero-knowledge proof data 504. After the verification is successful, an on-chain account status and a contract account status are changed according to the status change information. As shown in FIG. 5, total contract status data 508 stored in the resource locking contract in the main chain will be changed to total contract status data 509, and contract status data 510 of the main chain account A in the main chain will be changed to contract status data 511. At this moment, 10 virtual resources X will be stored in the resource locking contract. Also, the block 503 will be uploaded to a logical sub-chain 512.

In some embodiments, when the first transaction service type is an extraction service type, the status change information may include the target main chain account for executing an extraction service and target extraction status data. The process of changing statuses of the on-chain status data and the contract status data of the target main chain account according to the status change information in response to the transaction data belonging to a first transaction service type includes: obtaining a virtual resource corresponding to the target extraction status data from the contract virtual resources corresponding to the target main chain account as an extraction virtual resource in response to the transaction data belonging to the extraction service type; transferring the extraction virtual resource out of the resource locking contract; adding the on-chain status data and the target extraction status data to obtain status-changed on-chain status data; and subtracting the target extraction status data from the contract status data to obtain status-changed contract status data. For example, it is assumed that the main blockchain network contains a main chain account f, on-chain status data of the main chain account f is "tokenX: 20, tokenY: 50," contract status data of the main chain account f is "tokenX: 50, tokenY: 30," and the status change information is "main chain account f, extract tokenX: 20." The main chain node will extract 20 contract virtual resources X out of the resource locking contract for storage. At this moment, the number of contract virtual resources X stored in the resource locking contract is 30, the on-chain status data of the main chain account f will be changed to "tokenX: 40, tokenY: 50," and the contract status data of the main chain account f will be changed to "tokenX: 30, tokenY: 30."

Figure 6:
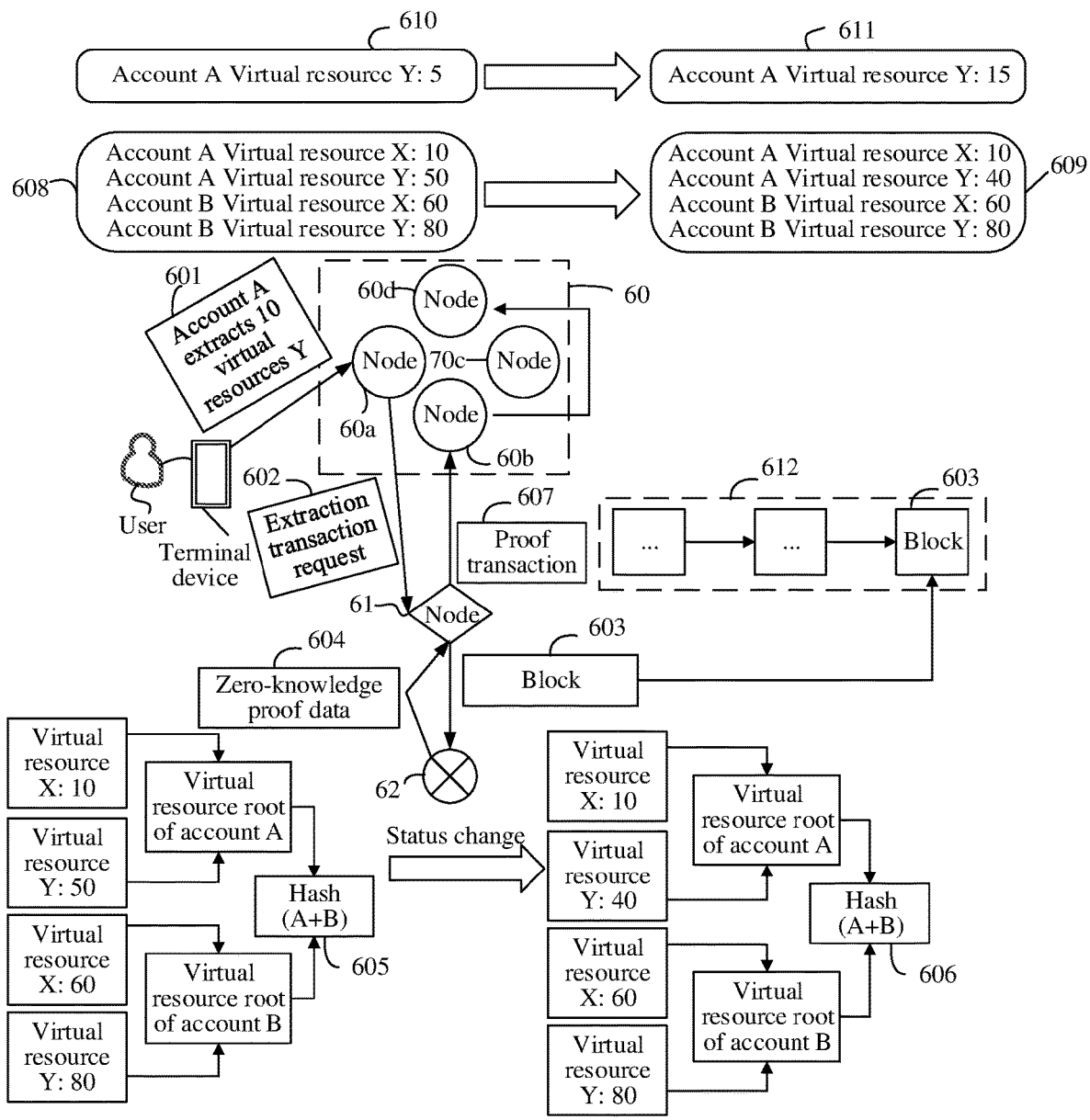
FIG. 6 is a schematic diagram showing an extraction transaction processing scenario according to an embodiment of this application.

In order to better understand the processing procedure of a transaction of an extraction service type, reference is made to FIG. 6 together. FIG. 6 is a schematic diagram showing an extraction transaction processing scenario according to an embodiment of this application. The terminal device shown in FIG. 6 may be any terminal device in the terminal device cluster 1000 in the embodiment corresponding to FIG. 1. For example, the terminal device may be the terminal device 1000b. A main chain node cluster 60 shown in FIG. 6 may be the main chain node cluster 10 in the embodiment corresponding to FIG. 1. A relay node 61 shown in FIG. 6 may be any sub-chain node in the sub-chain node cluster 100 in the embodiment corresponding to FIG. 1. For example, the relay node 61 may be the sub-chain node 100a.

As shown in FIG. 6, a user may commit an extraction transaction to a main chain through the bound terminal device. For example, the terminal device transmits an extraction transaction 601 to a main chain node 60a. The transaction content of the storage transaction 601 is "account A extracts 10 virtual resources Y." That is, a user A wants to transfer 10 virtual resources Y in a resource locking contract onto a chain for transaction in a main blockchain network. At this moment, the 10 virtual resources Y will be waiting to be locked. Then the main chain may transmit a main chain user extraction transaction request to a relay. For example, the main chain node 60a may transmit an extraction transaction request 602 to the relay node 61. After receiving the storage transaction request 602, the relay node 602 may collect and package all the transaction requests within a target time period on the main chain. For example, a block 603 contains the extraction transaction request 602. Also, the relay node 61 may input the block 603 into a zero-knowledge proof circuit 62 to generate zero-knowledge proof data 604. In some embodiments, the block 603 contains a transaction execution result corresponding to the transaction request, the relay node 603 may obtain status data of the sub-chain account, generate a first status hash value 605, obtain to-be-verified status data of the sub-chain account according to the transaction execution result, and generate a second status hash value 606. The relay node 603 may also determine a status data change value, namely a change value of the virtual resource Y of the sub-chain account A, and input the first status hash value 605, the second status hash value 606, and the status data change value into the zero-knowledge proof circuit 62 to verify the correctness of the status transition process of all transactions in the block 603. If the input information conforms to the verification procedure of the zero-knowledge proof circuit, the zero-knowledge proof circuit may output the zero-knowledge proof data 604 for proving that the extraction transaction request 602 is indeed executed. Then the relay node 61 may generate a proof transaction 607 containing the zero-knowledge proof data 604 and status change information to the main chain.

Assuming that the relay node 61 commits the proof transaction 607 to the main chain node 60b, and then the main chain node 60b may initiate consensus uploading for the proof transaction 607 in the main chain. If the proof transaction 607 is consensus-reached, the main chain node 60b invokes a proof contract to verify the zero-knowledge proof data 604. After the verification is successful, an on-chain account status and a contract account status are changed according to the status change information. As shown in FIG. 6, total contract status data 608 stored in the resource locking contract in the main chain will be changed to total contract status data 609, and contract status data 610 of the main chain account A in the main chain will be changed to contract status data 611. At this moment, 10 virtual resources X will be transferred onto a chain from the resource locking contract. Also, the block 603 will be uploaded to a logical sub-chain 612.

In some embodiments, when the second transaction service type is a transfer service type, the status change information may include the target main chain account for executing a transfer service and target transfer status data. The target main chain account includes a first main chain account and a second main chain account. The process of changing the status of the contract status data of the target main chain account according to the status change information in response to the transaction data belonging to a second transaction service type includes, in response to the transaction data belonging to the transfer service type: subtracting the target transfer status data from the contract status data of the first main chain account to obtain status-changed contract status data corresponding to the first main chain account; and adding the contract status data of the second main chain account and the target transfer status data to obtain status-changed contract status data corresponding to the second main chain account. It is assumed that the main blockchain network contains a main chain account g and a main chain account h, contract status data of the main chain account g is "tokenX: 60, tokenY: 30," contract status data of the main chain account h is "tokenX: 40, tokenY: 90," and the status change information is "main chain account g, transfers tokenY: 20 to main chain account h." The contract status data of the main chain account g will be changed to "tokenX: 60, tokenY: 10," and the contract status data of the main chain account h is changed to "tokenX: 40, tokenY: 110."

Figure 7:
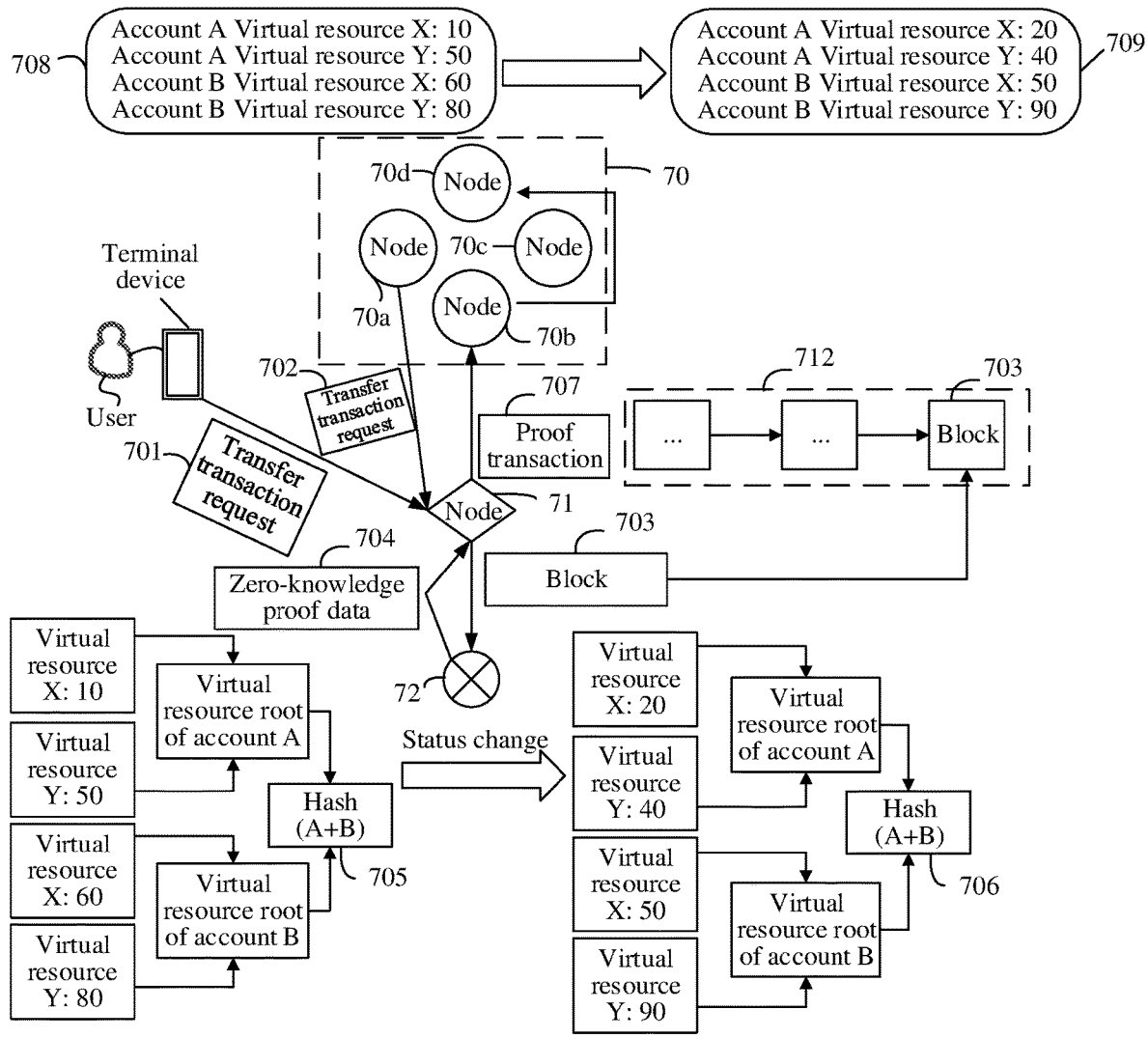
FIG. 7 is a schematic diagram showing a transfer transaction processing scenario according to an embodiment of this application.

In order to better understand the processing procedure of a transaction of a transfer service type, reference is made to FIG. 7 together. FIG. 7 is a schematic diagram showing a transfer transaction processing scenario according to an embodiment of this application. The terminal device shown in FIG. 7 may be any terminal device in the terminal device cluster 1000 in the embodiment corresponding to FIG. 1. For example, the terminal device may be the terminal device 1000b. A main chain node cluster 70 shown in FIG. 7 may be the main chain node cluster 10 in the embodiment corresponding to FIG. 1. A relay node 71 shown in FIG. 7 may be any sub-chain node in the sub-chain node cluster 100 in the embodiment corresponding to FIG. 1. For example, the relay node 71 may be the sub-chain node 100a.

As shown in FIG. 7, the user may directly transmit a transfer transaction request 701 to the relay node 72 through the bound terminal device. The transaction content of the transfer transaction request 701 may be "account B transfers 10 virtual resources X to account A." Also, the main chain node 70a may transmit a transfer transaction request 702 to the relay node 71. The transaction content of the transfer transaction request 702 may be "account A transfers 10 virtual resources Y to account B." The transfer transaction request 702 may be generated by the main chain node 70a based on the received transfer transaction. The relay may collect and package all transaction requests within a target time period on the main chain. For example, the block 703 contains the transfer transaction request 701 and the transfer transaction request 702. Also, the relay node 71 may input the block 703 into a zero-knowledge proof circuit 72 to generate zero-knowledge proof data 704. In some embodiments, the block 703 contains a transaction execution result corresponding to the transaction request, the relay node 703 may obtain status data of the sub-chain account, generate a first status hash value 705, obtain to-be-verified status data of the sub-chain account according to the transaction execution result, and generate a second status hash value 706. The relay node 703 may also determine a status data change value, namely a change value of each virtual resource in the sub-chain account, and input the first status hash value 705, the second status hash value 706, and the status data change value into the zero-knowledge proof circuit 72 to verify the correctness of the status transition process of all transactions in the block 703. If the input information conforms to the verification procedure of the zero-knowledge proof circuit, the zero-knowledge proof circuit may output the zero-knowledge proof data 704 for proving that the extraction transaction request 702 is indeed executed. Then the relay node 71 may generate a proof transaction 707 containing the zero-knowledge proof data 704 and status change information to the main chain. Assuming that the relay node 71 commits the proof transaction 707 to the main chain node 70b, and then the main chain node 70b may initiate consensus uploading for the proof transaction 707 in the main chain. If the proof transaction 707 is consensus-reached, the main chain node 70b invokes a proof contract to verify the zero-knowledge proof data 704. After the verification is successful, a contract account status is changed according to the status change information. As shown in FIG. 7, total contract status data 708 stored in the resource locking contract in the main chain will be changed to total contract status data 709.

In some embodiments, the main chain node may receive a contract address creation request, transmitted by a service node, for the target main chain account, and the main chain node may create, according to the contract address creation request, a contract address bound to the target main chain account in the resource locking contract as a target contract address. The target contract address is used for storing the contract status data of the target main chain account. Also, the main chain node may generate an account address creation request to the relay node according to the contract address creation request, and the relay node may create a sub-chain account address bound to the target sub-chain account associated with the target main chain account in the sub-blockchain network according to the account address creation request. The sub-chain account address is used for storing the status data of the target sub-chain account.

By adopting the method provided by embodiments of the application, virtual resources in a main blockchain network may be transferred to a resource locking contract for storage, and a virtual resource stored in the resource locking contract will be used as a contract virtual resource. The execution process of transaction data for the contract virtual resource in the main blockchain network is transferred to be executed in a sub-blockchain network to obtain a transaction execution result. A main chain node only needs to receive zero-knowledge proof data and status change information associated with the transaction execution result that are committed by a relay node, invokes a proof contract to prove and verify the zero-knowledge proof data to obtain a proof and verification result, and changes status data of a target main chain account according to the status change information when the proof and verification result is a proof and verification success result, thus saving the time for the main chain node to execute the transaction and greatly improving the TPS of the main blockchain network. In addition, execution data related to the transaction data in the sub-blockchain network does not need to be committed to the main blockchain network, thus relieving the transaction storage pressure in the main blockchain network. In addition, virtual resources in the main blockchain network that are not stored in the resource locking contract may be used for normal transaction, thus greatly improving the flexibility of the main blockchain network for the transaction of the virtual resources and increasing the transaction processing speed.

Figure 8:
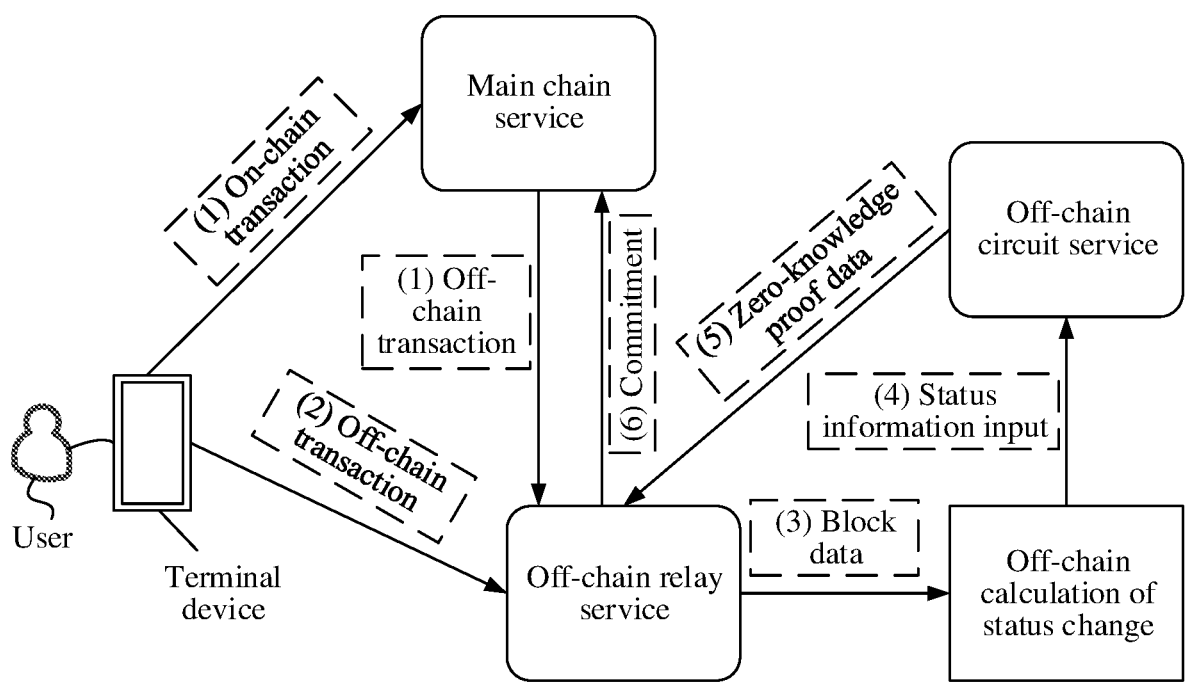
FIG. 8 is a schematic interaction diagram of a blockchain-based data processing method according to an embodiment of this application.

Reference is made to FIG. 8. FIG. 8 is a schematic interaction diagram of a blockchain-based data processing method according to an embodiment of this application. The data processing method is suitable for a virtual resource transaction scenario. As shown in FIG. 8, the whole data interaction process is based on three services, namely an off-chain relay (Operator) service, an off-chain circuit (Circuit) service, and a main chain (Ethereum) service. The off-chain relay (Operator) service mainly collects on-chain and off-chain transactions of users, and executes the collected transactions off the chain and packages the transactions to generate block_data (block data). The off-chain circuit (Circuit) service mainly packages block_data generated by the off-chain relay service, runs the data in the circuit to generate a proof calculated off the chain, namely, zero-knowledge proof data, and commits the proof to the main chain as a transaction. The main chain service receives a proof transaction committed by the operator, and verifies the transaction in the contract of the main chain, whereby the off-chain execution of a batch of transactions may be completed, and the status change of a batch of transactions may be completed only by verifying the proof of a batch of transactions generated off the chain. The off-chain relay service and the off-chain circuit service may be realized by the relay node in the sub-blockchain network, and the main chain service may be realized by the main chain node in the main blockchain network.

As shown in FIG. 8, the flow of the whole data interaction process is as follows:
(1) Through the bound terminal device, the user may initiate an on-chain transaction to an on-chain node providing the main chain service (which may be the main chain node in the main blockchain network). The on-chain node may convert the on-chain transaction into an off-chain transaction and transmit the off-chain transaction to an off-chain node providing the off-chain relay service (which may be the sub-chain node in the sub-blockchain network).
(2) The user may also directly transmit the off-chain transaction to the off-chain node providing the off-chain relay service through the bound terminal device.
(3) The off-chain node providing the off-chain relay service executes the collected transaction and packages the transaction to generate block data.
(4) The off-chain node providing the off-chain relay service calculates a status change (which may be the total account status data and the to-be-verified total account status data in the sub-blockchain network) of off-chain accounts (which may be the sub-chain accounts in the sub-blockchain network) before and after the transaction based on the block data, and generates status information (which may be the first status hash value, the second status hash value, and the status data change value).
(5) The off-chain node providing the off-chain relay service inputs the status information to an off-chain node providing the off-chain circuit service. The off-chain node providing the off-chain circuit service inputs the status information into the circuit to obtain zero-knowledge proof data proof, which is returned to the off-chain node providing the off-chain relay service. It is to be understood that the off-chain node providing the off-chain relay service and the off-chain node providing the off-chain circuit service may be the same node.
(6) The off-chain node providing the off-chain relay service constitutes a transaction with the proof and the status change information, and commits the transaction to the on-chain node providing the main chain service. The on-chain node providing the main chain service may perform consensus uploading on the transaction in the main chain contract.

By adopting the method provided by embodiments of the application, an off-chain relay service, an off-chain circuit service, and a main chain service are introduced in a virtual resource transaction scenario, transactions in a main blockchain network are transferred to be executed off the chain, and the transactions may be executed in batches. Only zero-knowledge proof data for correct execution of this batch of transactions is generated off the chain, and the zero-knowledge proof data and status change information associated with a transaction execution result is assembled into a proof transaction which is committed to the chain. Only one proof transaction needs to be uploaded by consensus on the chain. As long as it is determined that the zero-knowledge proof data in the proof transaction is passed, this batch of transactions executed by the sub-chain are considered to be effective, thus greatly improving the TPS of the virtual resource transaction, relieving the data storage pressure on the main chain, and improving the user transaction experience of virtual resources in the main blockchain network.

Figure 9:
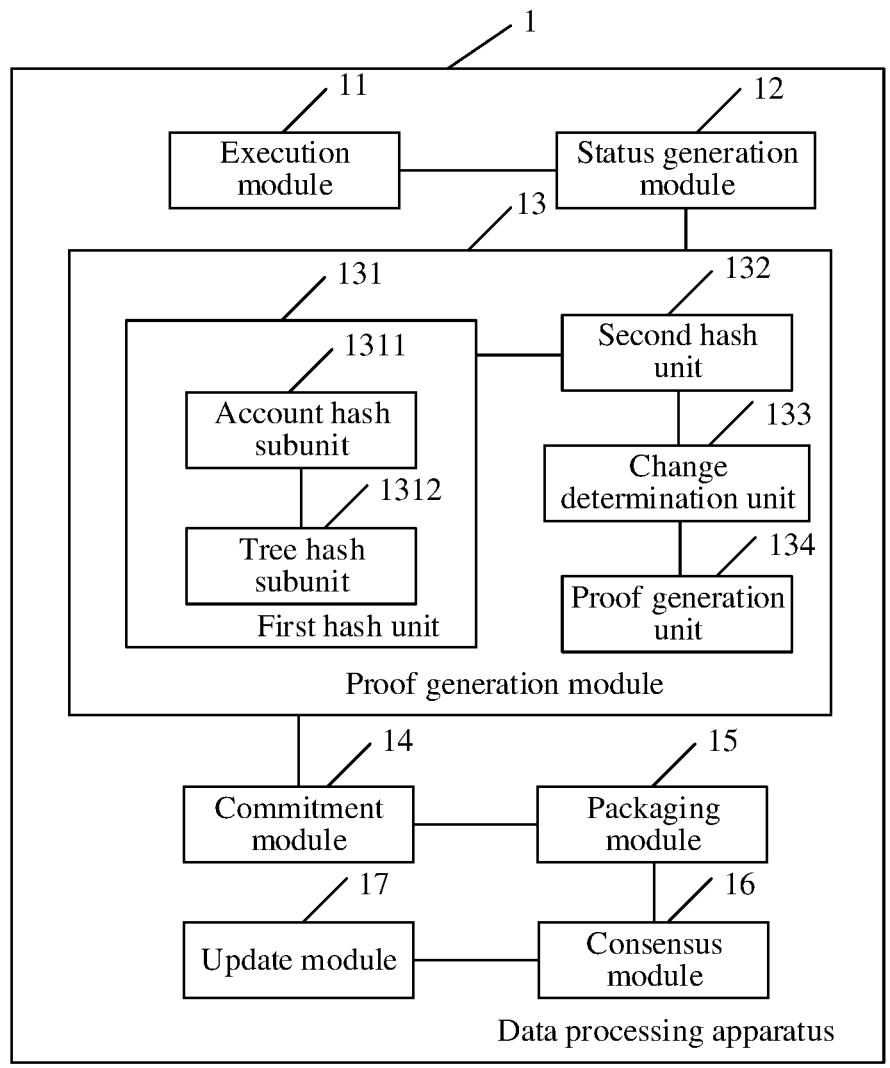
FIG. 9 is a schematic structural diagram of a blockchain-based data processing apparatus according to an embodiment of this application.

Reference is made to FIG. 9. FIG. 9 is a schematic structural diagram of a blockchain-based data processing apparatus according to an embodiment of this application. The data processing apparatus may be a computer program (including program codes) running in a computer device. For example, the data processing apparatus is application software. The apparatus may be configured to perform corresponding steps in the data processing method according to embodiments of the application. As shown in FIG. 9, the data processing apparatus 1 may include: an execution module 11, a status generation module 12, a proof generation module 13, and a commitment module 14.

The execution module 11 is configured to execute transaction data for a target sub-chain account to obtain a transaction execution result. A relay node belongs to a sub-blockchain network.

The status generation module 12 is configured to obtain total account status data in the sub-blockchain network, and generate to-be-verified total account status data according to the transaction execution result and the total account status data. The total account status data includes status data of at least two sub-chain accounts, and the at least two sub-chain accounts include the target sub-chain account.

The proof generation module 13 is configured to generate zero-knowledge proof data according to the total account status data and the to-be-verified total account status data.

The commitment module 14 is configured to commit the zero-knowledge proof data and status change information associated with the transaction execution result to a main chain node, whereby the main chain node changes status data of a target main chain account according to the status change information in a case that the zero-knowledge proof data is proved and verified. The target sub-chain account is associated with the target main chain account. The main chain node belongs to a main blockchain network.

For the specific implementations of the execution module 11, the status generation module 12, the proof generation module 13, and the commitment module 14, reference may be made to the descriptions for step S101 to step S104 in the embodiment corresponding to FIG. 3, and details are not described herein again.

Referring to FIG. 9 again, the proof generation module 13 includes: a first hash unit 131, a second hash unit 132, a change determination unit 133, and a proof generation unit 134.

The first hash unit 131 is configured to hash the total account status data to obtain a first status hash value.

The second hash unit 132 is configured to hash the to-be-verified total account status data to obtain a second status hash value.

The change determination unit 133 is configured to determine status data change values corresponding to the at least two sub-chain accounts according to the total account status data and the to-be-verified total account status data.

The proof generation unit 134 is configured to input the first status hash value, the second status hash value, and the status data change values into the zero-knowledge proof circuit to obtain the zero-knowledge proof data.

For the specific implementations of the first hash unit 131, the second hash unit 132, the change determination unit 133, and the proof generation unit 134, reference may be made to the description for step S103 in the embodiment corresponding to FIG. 3, and details are not described herein again.

Referring to FIG. 9 again, the first hash unit 131 includes: an account hash subunit 1311 and a tree hash subunit 1312.

The account hash subunit 1311 is configured to perform a hash operation on the status data of the at least two sub-chain accounts in the total account status data to obtain account status hash values corresponding to the at least two sub-chain accounts respectively.

The tree hash subunit 1312 is configured to perform a hash operation on the account status hash values corresponding to the at least two sub-chain accounts respectively according to a status Merkle tree path to obtain a root hash value, and determine the root hash value as the first status hash value.

For the specific implementations of the account hash subunit 1311 and the tree hash subunit 1312, reference may be made to the description for step S103 in the embodiment corresponding to FIG. 3, and details are not described herein again.

Referring to FIG. 9 again, the data processing apparatus 1 further includes: a packaging module 15, a consensus module 16, and an update module 17.

The packaging module 15 is configured to package the transaction data into a to-be-uploaded sub-chain block.

The consensus module 16 is configured to perform consensus processing on the to-be-uploaded sub-chain block after the zero-knowledge proof data is proved and verified by the main chain node.

The update module 17 is configured to update the total account status data in a ledger of the sub-blockchain network as the to-be-verified total account status data after the to-be-uploaded sub-chain block is consensus-reached.

For the specific implementations of the packaging module 15, the consensus module 16, and the update module 17, reference may be made to the descriptions for optional embodiments in the embodiment corresponding to FIG. 3, and details are not described herein again.

In embodiments of the application, after executing transaction data for a target sub-chain account to obtain a transaction execution result, a relay node of a sub-blockchain network may obtain total account status data in the sub-blockchain network, generate to-be-verified total account status data according to the transaction execution result and the total account status data, and then generate zero-knowledge proof data according to the total account status data and the to-be-verified total account status data. Finally, the relay node commits the zero-knowledge proof data and status change information associated with the transaction execution result to a main chain node of a main blockchain network, and the main chain node may change status data of a target main chain account according to the status change information when the zero-knowledge proof data is proved and verified. The total account status data includes status data of at least two sub-chain accounts, and the at least two sub-chain accounts include the target sub-chain account. The target sub-chain account is associated with the target main chain account. According to the method provided by embodiments of the application, a main chain account in a main blockchain network is associated with a sub-chain account in a sub-blockchain network. Transaction logic for a target main chain account is converted into transaction data for a target sub-chain account, and then the transaction data is executed at a relay node of the sub-blockchain network. A main chain node generates zero-knowledge proof data after verifying the transaction data executed by the relay node. After the verification is successful, status data of the main chain account may be changed according to status change information, thus saving the time for the main chain node to execute the transaction and greatly improving the TPS of the main blockchain network. In addition, execution data related to the transaction data in the sub-blockchain network does not need to be committed to the main blockchain network, thus relieving the transaction storage pressure in the main blockchain network.

Figure 10:
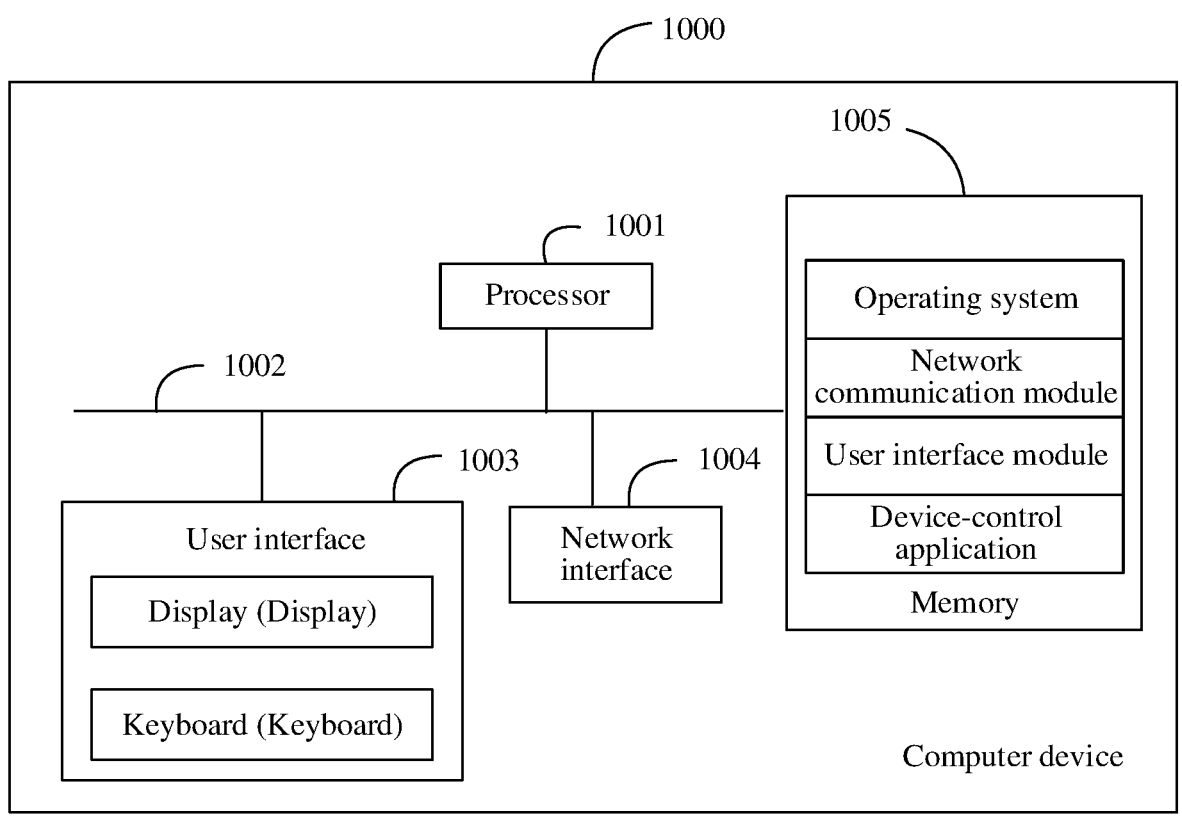
FIG. 10 is a schematic structural diagram of a computer device according to an embodiment of this application.

Reference is made to FIG. 10. FIG. 10 is a schematic structural diagram of a computer device according to an embodiment of this application. As shown in FIG. 10, the computer device 1000 may include: a processor 1001, a network interface 1004, and a memory 1005. Furthermore, the computer device 1000 may further include: a user interface 1003 and at least one communication bus 1002. The communication bus 1002 is configured to implement connection and communication between the components. The user interface 1003 may include a display, a keyboard. Optionally, the user interface 1003 may further include a standard wired interface and a standard wireless interface. In some embodiments, the network interface 1004 may include a standard wired interface and a standard wireless interface (such as a WI-FI interface). The memory 1005 may be a high-speed random access memory (RAM), or may be a non-volatile memory, for example, at least one magnetic disk memory. In some embodiments, the memory 1005 may also be at least one storage apparatus located away from the foregoing processor 1001. As shown in FIG. 10, the memory 1005 used as a computer-readable storage medium may include an operating system, a network communication module, a user interface module, and a device-control application.

In the computer device 1000 as shown in FIG. 10, the network interface 1004 may provide a network communication network element. The user interface 1003 is mainly used as an interface enabling input by a user. The processor 1001 may be configured to invoke the device-control application stored in the memory 1005 to:

execute transaction data for a target sub-chain account to obtain a transaction execution result, a relay node belonging to a sub-blockchain network;

obtain total account status data in a sub-blockchain network, and generating to-be-verified total account status data according to the transaction execution result and the total account status data, the total account status data including status data of at least two sub-chain accounts, and the at least two sub-chain accounts including the target sub-chain account;

generate zero-knowledge proof data according to the total account status data and the to-be-verified total account status data; and commit the zero-knowledge proof data and status change information associated with the transaction execution result to a main chain node, whereby the main chain node changes status data of a target main chain account according to the status change information when the zero-knowledge proof data is proved and verified, the target sub-chain account being associated with the target main chain account, and the main chain node belonging to a main blockchain network.

It is to be understood that the computer device 1000 described in embodiments of the application may perform the data processing method in any embodiment corresponding to FIG. 3, and details are not described herein again. In addition, the beneficial effects of the same method are not described herein again.

Furthermore, embodiments of the application also provide a computer-readable storage medium. Computer programs executed by the aforementioned data processing apparatus 1 are stored in the computer-readable storage medium. The computer programs include program instructions. When a processor executes the program instructions, the data processing method in any embodiment corresponding to FIG. 3 can be performed. Therefore, details are not described herein again. In addition, the beneficial effects of the same method are not described herein again. For technical details that are not disclosed in the computer-readable storage medium embodiment involved in this application, reference is made to the description of the method embodiment of this application.

Figure 11:
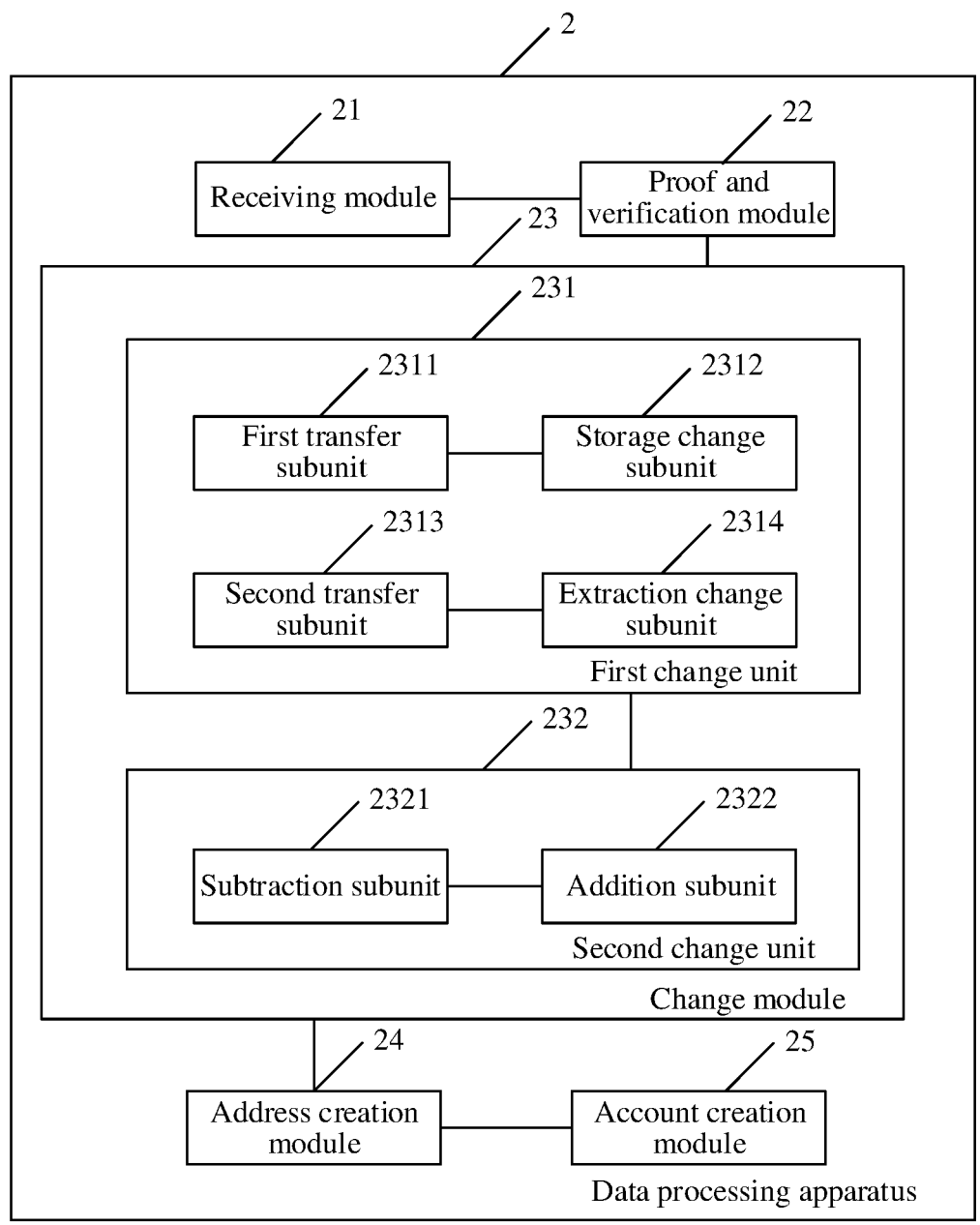
FIG. 11 is a schematic structural diagram of another blockchain-based data processing apparatus according to an embodiment of this application.

Reference is made to FIG. 11. FIG. 11 is a schematic structural diagram of another blockchain-based data processing apparatus according to an embodiment of this application. The data processing apparatus may be a computer program (including program codes) running in a computer device. For example, the data processing apparatus is application software. The apparatus may be configured to perform corresponding steps in the method according to embodiments of the application. As shown in FIG. 11, the data processing apparatus 2 may include: a receiving module 21, a proof and verification module 22, and a change module 23.

The receiving module 21 is configured to receive zero-knowledge proof data and status change information associated with a transaction execution result that are committed by a relay node. A main chain node belongs to a main blockchain network. The relay node belongs to a sub-blockchain network. The zero-knowledge proof data is generated according to total account status data of the sub-blockchain network and to-be-verified total account status data. The to-be-verified total account status data is generated according to the transaction execution result and the total account status data. The transaction execution result is obtained by executing transaction data for the target sub-chain account by the relay node.

The proof and verification module 22 is configured to invoke a proof contract to prove and verify the zero-knowledge proof data to obtain a proof and verification result.

The change module 23 is configured to change status data of a target main chain account according to the status change information in response to the proof and verification result being a proof and verification success result. The target sub-chain account is associated with the target main chain account.

For the specific implementations of the receiving module 21, the proof and verification module 22, and the change module 23, reference may be made to the descriptions for step S201 to step S203 in the embodiment corresponding to FIG. 4, and details are not described herein again.

The status data of the target main chain account includes on-chain status data and contract status data of the target main chain account. The on-chain status data is used for characterizing on-chain virtual resources owned by the target main chain account in the main blockchain network and not locked in a resource locking contract. The contract status data is used for characterizing contract virtual resources owned by the target main chain account in the main blockchain network and locked in the resource locking contract.

Referring to FIG. 11 again, the change module 23 includes: a first change unit 231 and a second change unit 232.

The first change unit 231 is configured to change statuses of the on-chain status data and the contract status data of the target main chain account according to the status change information in response to the transaction data belonging to a first transaction service type.

The second change unit 232 is configured to change the status of the contract status data of the target main chain account according to the status change information in response to the transaction data belonging to a second transaction service type.

For the specific implementations of the first change unit 231 and the second change unit 232, reference may be made to the description for step S203 in the embodiment corresponding to FIG. 4, and details are not described herein again.

The first transaction service type is a storage service type, and the status change information includes the target main chain account for executing a storage service and target storage status data.

Referring to FIG. 11 again, the first change unit 231 includes: a first transfer subunit 2311 and a storage change subunit 2312.

The first transfer subunit 2311 is configured to obtain a virtual resource corresponding to the target storage status data from the on-chain virtual resources corresponding to the target main chain account as a storage virtual resource in response to the transaction data belonging to the storage service type.

The first transfer subunit 2311 is further configured to transfer the storage virtual resource to the resource locking contract for locking.

The storage change subunit 2312 is configured to subtract the target storage status data from the on-chain status data to obtain status-changed on-chain status data.

The storage change subunit 2312 is further configured to add the contract status data and the target storage status data to obtain status-changed contract status data.

For the specific implementations of the first transfer subunit 2311 and the storage change subunit 2312, reference may be made to the description for step S203 in the embodiment corresponding to FIG. 4, and details are not described herein again.

The first transaction service type is an extraction service type, and the status change information includes the target main chain account for executing an extraction service and target extraction status data.

Referring to FIG. 11 again, the first change unit 231 includes: a second transfer subunit 2313 and an extraction change subunit 2314.

The second transfer subunit 2313 is configured to obtain a virtual resource corresponding to the target extraction status data from the contract virtual resources corresponding to the target main chain account as an extraction virtual resource in response to the transaction data belonging to the extraction service type.

The second transfer subunit 2313 is further configured to transfer the extraction virtual resource out of the resource locking contract.

The extraction change subunit 2314 is configured to add the on-chain status data and the target extraction status data to obtain status-changed on-chain status data.

The extraction change subunit 2314 is further configured to subtract the target extraction status data from the contract status data to obtain status-changed contract status data.

For the specific implementations of the second transfer subunit 2313 and the extraction change subunit 2314, reference may be made to the description for step S203 in the embodiment corresponding to FIG. 4, and details are not described herein again.

The second transaction service type is a transfer service type, and the status change information includes the target main chain account for executing a transfer service and target transfer status data. The target main chain account includes a first main chain account and a second main chain account.

Referring to FIG. 11 again, the second change unit 232 includes: a subtraction subunit 2321 and an addition subunit 2322.

The subtraction subunit 2321 is configured to subtract the target transfer status data from the contract status data of the first main chain account to obtain status-changed contract status data corresponding to the first main chain account in response to the transaction data belonging to the transfer service type.

The addition subunit 2322 is configured to add the contract status data of the second main chain account and the target transfer status data to obtain status-changed contract status data corresponding to the second main chain account in response to the transaction data belonging to the transfer service type.

For the specific implementations of the subtraction subunit 2321 and the addition subunit 2322, reference may be made to the description for step S203 in the embodiment corresponding to FIG. 4, and details are not described herein again.

Referring to FIG. 11 again, the data processing apparatus 2 further includes: an address creation module 24 and an account creation module 25.

The address creation module 24 is configured to receive a contract address creation request, transmitted by a service node, for the target main chain account.

The address creation module 24 is further configured to create, according to the contract address creation request, a contract address bound to the target main chain account in the resource locking contract as a target contract address. The target contract address is used for storing the contract status data of the target main chain account.

The account creation module 25 is configured to generate an account address creation request to the relay node according to the contract address creation request, whereby the relay node creates a sub-chain account address bound to the target sub-chain account associated with the target main chain account in the sub-blockchain network according to the account address creation request. The sub-chain account address is used for storing the status data of the target sub-chain account.

For the specific implementations of the address creation module 24 and the account creation module 25, reference may be made to optional descriptions in the embodiment corresponding to FIG. 4, and details are not described herein again.

In embodiments of the application, virtual resources in a main blockchain network may be transferred to a resource locking contract for storage, and a virtual resource stored in the resource locking contract will be used as a contract virtual resource. The execution process of transaction data for the contract virtual resource in the main blockchain network is transferred to be executed in a sub-blockchain network to obtain a transaction execution result. A main chain node only needs to receive zero-knowledge proof data and status change information associated with the transaction execution result that are committed by a relay node, invokes a proof contract to prove and verify the zero-knowledge proof data to obtain a proof and verification result, and changes status data of a target main chain account according to the status change information when the proof and verification result is a proof and verification success result, thus saving the time for the main chain node to execute the transaction and greatly improving the TPS of the main blockchain network. In addition, execution data related to the transaction data in the sub-blockchain network does not need to be committed to the main blockchain network, thus relieving the transaction storage pressure in the main blockchain network. In addition, virtual resources in the main blockchain network that are not stored in the resource locking contract may be used for normal transaction, thus greatly improving the flexibility of the main blockchain network for the transaction of the virtual resources and increasing the transaction processing speed.

Figure 12:
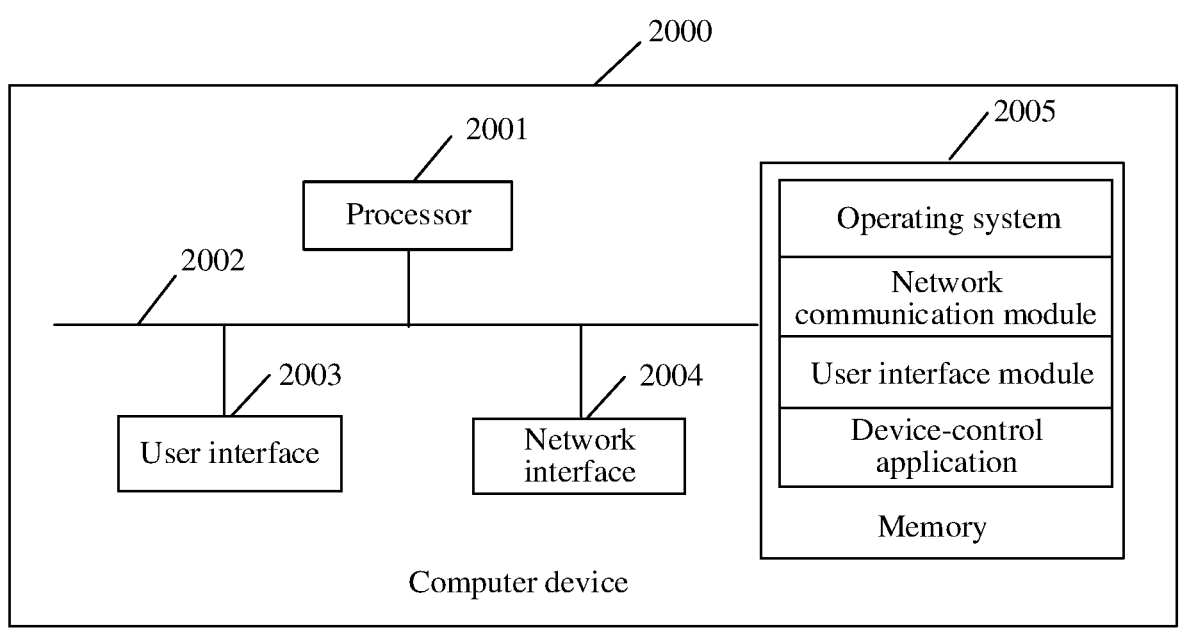
FIG. 12 is a schematic structural diagram of another computer device according to an embodiment of this application.

Reference is made to FIG. 12. FIG. 12 is a schematic structural diagram of another computer device according to an embodiment of this application. As shown in FIG. 12, the data processing apparatus 2 in the embodiment corresponding to FIG. 11 may be applied to the computer device 2000. The computer device 2000 may include: a processor 2001, a network interface 2004, and a memory 2005. Furthermore, the computer device 2000 further includes: a user interface 2003 and at least one communication bus 2002. The communication bus 2002 is configured to implement connection and communication between the components. The user interface 2003 may include a display, a keyboard. Optionally, the user interface 2003 may further include a standard wired interface and a standard wireless interface. In some embodiments, the network interface 2004 may include a standard wired interface and a standard wireless interface (such as a WI-FI interface). The memory 2005 may be a high-speed random access memory (RAM), or may be a non-volatile memory, for example, at least one magnetic disk memory. In some embodiments, the memory 2005 may also be at least one storage apparatus located away from the foregoing processor 2001. As shown in FIG. 12, the memory 2005 used as a computer-readable storage medium may include an operating system, a network communication module, a user interface module, and a device-control application.

In the computer device 2000 shown in FIG. 12, the network interface 2004 may provide a network communication function. The user interface 2003 is mainly used as an interface enabling input by a user. The processor 2001 may be configured to invoke the device-control application stored in the memory 2005 to:
- receive zero-knowledge proof data and status change information associated with a transaction execution result that are committed by a relay node, a main chain node belonging to a main blockchain network, the relay node belonging to a sub-blockchain network, the zero-knowledge proof data being generated by using a preset zero-knowledge proof circuit according to total account status data of the sub-blockchain network and to-be-verified total account status data, the to-be-verified total account status data is generated according to the transaction execution result and the total account status data, and the transaction execution result being obtained by executing transaction data for the target sub-chain account by the relay node;
- invoke a proof contract to prove and verify the zero-knowledge proof data to obtain a proof and verification result; and
- change status data of a target main chain account according to the status change information in response to the proof and verification result being a proof and verification success result, the target sub-chain account being associated with the target main chain account.

It is to be understood that the computer device 2000 described in embodiments of the application may perform the access control method in the foregoing embodiments or implement the data processing apparatus 2 in the embodiment corresponding to FIG. 11, and details are not described herein again. In addition, the beneficial effects of the same method are not described herein again.

Furthermore, embodiments of the application also provide a computer-readable storage medium. Computer programs executed by the aforementioned data processing apparatus 2 are stored in the computer-readable storage medium. When a processor loads and executes the computer programs, the access control method in any of the foregoing embodiments can be performed. Therefore, details are not described herein again. In addition, the beneficial effects of the same method are not described herein again. For technical details that are not disclosed in the computer-readable storage medium embodiment involved in this application, reference is made to the description of the method embodiment of this application.

The computer-readable storage medium may be the data processing apparatus according to any of the foregoing embodiments or an internal storage unit of the computer device, for example, a hard disk or an internal memory of the computer device. The computer-readable storage medium may also be an external storage device of the computer device, such as a plug-in hard disk, a smart media card (SMC), a secure digital (SD) card, or a flash card provided on the computer device. Further, the computer-readable storage medium may also include both the internal storage unit and the external storage device of the computer device. The computer-readable storage medium is configured to store the computer program and other programs and data required by the computer device. The computer-readable storage medium may be further configured to temporarily store data that has been outputted or is to be outputted.

Furthermore, embodiments of the application also provide a computer program product or a computer program. The computer program product or the computer program includes computer instructions. The computer instructions are stored in a computer-readable storage medium. A processor of a computer device reads the computer instructions from the computer-readable storage medium. The processor executes the computer instructions, whereby the computer device performs the method according to any of the embodiments corresponding to FIG. 3 and FIG. 4.

The terms "first," "second," and the like in the specification, in the claims and in the drawings of the embodiments of this application are used for distinguishing between different objects and not necessarily for describing a particular sequence. Furthermore, the terms "include" and any variations thereof are intended to cover a non-exclusive inclusion. For example, a process, method, apparatus, product, or device that contains a list of steps or units is not limited to the listed steps or modules, but may optionally include steps or modules not listed, or may optionally include other step units inherent to such process, method, apparatus, product, or device.

A person of ordinary skill in the art may understand that, units and algorithm steps of the examples described in the foregoing disclosed embodiments may be implemented by electronic hardware, computer software, or a combination thereof. To clearly describe the interchangeability between the hardware and the software, the foregoing has generally described compositions and steps of each example based on network elements. Whether the network elements are executed in a mode of hardware or software depends on particular applications and design constraint conditions of the technical solutions. A person skilled in the art may use different methods to implement the described network elements for each particular application, but it should not be considered that the implementation goes beyond the scope of this application.

The technical features of the foregoing embodiments may be combined in any combination. In order to make the description concise, not all the possible combinations of the technical features in the foregoing embodiments are described. However, as long as there is no contradiction between the combinations of these technical features, the combinations are to be considered within the scope of this specification.

What is disclosed above is merely exemplary embodiments of this application, and certainly is not intended to limit the scope of the claims of this application. Therefore, equivalent variations made in accordance with the claims of this application shall fall within the scope of this application.

What is claimed is:

1. A blockchain-based data processing method comprising:
   - executing, by a relay node, transaction data for a target sub-chain account to obtain a transaction execution result, the relay node belonging to a sub-blockchain network;

obtaining total account status data in the sub-blockchain network, the total account status data including status data of at least two sub-chain accounts, and the at least two sub-chain accounts including the target sub-chain account;

generating candidate total account status data that includes data obtained by modifying the status data of the target sub-chain account in the total account status data according to the transaction execution result;

generating zero-knowledge proof data using a preset zero-knowledge proof circuit according to the total account status data and the candidate total account status data; and committing the zero-knowledge proof data and status change information associated with the transaction execution result to a main chain node, to enable the main chain node to change status data of a target main chain account according to the status change information in response to the zero-knowledge proof data being proved and verified, the target sub-chain account being associated with the target main chain account, and the main chain node belonging to a main blockchain network, wherein the status data of the target main chain account includes: on-chain status data characterizing on-chain virtual resources owned by the target main chain account in the main blockchain network and not locked in a resource locking contract, and contract status data characterizing contract virtual resources owned by the target main chain account in the main blockchain network and locked in the resource locking contract;

in response to the transaction data belonging to a first transaction service type, statuses of the on-chain status data and the contract status data of the target main chain account are changed according to the status change information; and in response to the transaction data belonging to a second transaction service type, a status of the contract status data of the target main chain account is changed according to the status change information.

2. The method according to claim 1, wherein generating the zero-knowledge proof data includes:

hashing the total account status data to obtain a first status hash value;

hashing the candidate total account status data to obtain a second status hash value;

determining status data change values corresponding to the at least two sub-chain accounts, respectively, according to the total account status data and the candidate total account status data; and inputting the first status hash value, the second status hash value, and the status data change values into the zero-knowledge proof circuit to obtain the zero-knowledge proof data.

3. The method according to claim 2, wherein hashing the total account status data includes:

performing a hash operation on the status data of the at least two sub-chain accounts to obtain account status hash values corresponding to the at least two sub-chain accounts, respectively; and performing a hash operation on the account status hash values according to a status Merkle tree path to obtain the first status hash value.

4. The method according to claim 1, further comprising:
packaging the transaction data into a sub-chain block;

performing consensus processing on the sub-chain block after the zero-knowledge proof data is proved and verified by the main chain node; and updating the total account status data in a ledger of the sub-blockchain network to the candidate total account status data after the sub-chain block has passed the consensus processing.

5. A non-transitory computer-readable storage medium storing one or more computer programs that, when executed by one or more processors, cause the one or more processors to perform the method according to claim 1.

6. The method according to claim 1, wherein:
the first transaction service type includes a storage service type or an extraction service type; or
the second transaction service type includes a transfer service type.

7. The method according to claim 6, wherein:
in response to the transaction data belonging to the storage service type, the status change information includes the target main chain account for executing a storage service and target storage status data;
in response to the transaction data belonging to the extraction service type, the status change information includes the target main chain account for executing an extraction service and target extraction status data; or
in response to the transaction data belonging to the transfer service type, the status change information includes the target main chain account for executing a transfer service and target transfer status data, and the target main chain account includes a first main chain account and a second main chain account.

8. A computer device comprising:
one or more processors; and
one or more memories storing one or more computer programs that, when executed by the one or more processors, cause the one or more processors to:
execute transaction data for a target sub-chain account to obtain a transaction execution result;
obtain total account status data in a sub-blockchain network, the total account status data including status data of at least two sub-chain accounts, and the at least two sub-chain accounts including the target sub-chain account;
generate candidate total account status data that includes data obtained by modifying the status data of the target sub-chain account in the total account status data according to the transaction execution result;
generate zero-knowledge proof data using a preset zero-knowledge proof circuit according to the total account status data and the candidate total account status data; and
commit the zero-knowledge proof data and status change information associated with the transaction execution result to a main chain node, to enable the main chain node to change status data of a target main chain account according to the status change information in response to the zero-knowledge proof data being proved and verified, the target sub-chain account being associated with the target main chain account, and the main chain node belonging to a main blockchain network,
wherein the status data of the target main chain account includes: on-chain status data characterizing on-chain virtual resources owned by the target main chain account in the main blockchain network and not locked in a resource locking contract, and contract status data characterizing contract virtual resources owned by the target main chain account in the main blockchain network and locked in the resource locking contract;

in response to the transaction data belonging to a first transaction service type, statuses of the on-chain status data and the contract status data of the target main chain account are changed according to the status change information; and in response to the transaction data belonging to a second transaction service type, a status of the contract status data of the target main chain account is changed according to the status change information.

9. The computer device according to claim 8, wherein the one or more programs further cause the one or more processors to:

hash the total account status data to obtain a first status hash value;

hash the candidate total account status data to obtain a second status hash value;

determine status data change values corresponding to the at least two sub-chain accounts, respectively, according to the total account status data and the candidate total account status data; and input the first status hash value, the second status hash value, and the status data change values into the zero-knowledge proof circuit to obtain the zero-knowledge proof data.

10. The computer device according to claim 9, wherein the one or more programs further cause the one or more processors to:

perform a hash operation on the status data of the at least two sub-chain accounts to obtain account status hash values corresponding to the at least two sub-chain accounts, respectively; and perform a hash operation on the account status hash values according to a status Merkle tree path to obtain the first status hash value.

11. The computer device according to claim 8, wherein the one or more programs further cause the one or more processors to:

package the transaction data into a sub-chain block;

perform consensus processing on the sub-chain block after the zero-knowledge proof data is proved and verified by the main chain node; and update the total account status data in a ledger of the sub-blockchain network to the candidate total account status data after the sub-chain block has passed the consensus processing.

12. A blockchain-based data processing method comprising:

receiving, by a main chain node, zero-knowledge proof data and status change information associated with a transaction execution result that relate to a target sub-chain account and are committed by a relay node, the main chain node belonging to a main blockchain network, the relay node belonging to a sub-blockchain network;

invoking a proof contract to prove and verify the zero-knowledge proof data to obtain a proof and verification result; and changing status data of a target main chain account according to the status change information in response to the proof and verification result indicating the zero-knowledge proof data is successfully proved and verified, the target sub-chain account being associated with the target main chain account, wherein the status data of the target main chain account includes: on-chain status data characterizing on-chain virtual resources owned by the target main chain account in the main blockchain network and not locked in a resource locking contract, and contract status data characterizing contract virtual resources owned by the target main chain account in the main blockchain network and locked in the resource locking contract; and changing the status data of the target main chain account includes:

changing statuses of the on-chain status data and the contract status data of the target main chain account according to the status change information in response to transaction data belonging to a first transaction service type; and changing a status of the contract status data of the target main chain account according to the status change information in response to the transaction data belonging to a second transaction service type.

13. The method according to claim 12, wherein:

the first transaction service type is a storage service type, and the status change information includes the target main chain account for executing a storage service and target storage status data; and changing the statuses of the on-chain status data and the contract status data in response to the transaction data belonging to the first transaction service type includes, in response to the transaction data belonging to the storage service type:

obtaining a virtual resource corresponding to the target storage status data from the on-chain virtual resources corresponding to the target main chain account as a storage virtual resource;

transferring the storage virtual resource to the resource locking contract for locking;

subtracting the target storage status data from the on-chain status data; and adding the contract status data and the target storage status data.

14. The method according to claim 12, wherein:

the first transaction service type is an extraction service type, and the status change information includes the target main chain account for executing an extraction service and target extraction status data; and changing the statuses of the on-chain status data and the contract status data in response to the transaction data belonging to the first transaction service type includes, in response to the transaction data belonging to the extraction service type:

obtaining a virtual resource corresponding to the target extraction status data from the contract virtual resources corresponding to the target main chain account as an extraction virtual resource;

transferring the extraction virtual resource out of the resource locking contract;

adding the on-chain status data and the target extraction status data; and subtracting the target extraction status data from the contract status data.

15. The method according to claim 12, wherein:

the second transaction service type is a transfer service type, the status change information includes the target main chain account for executing a transfer service and target transfer status data, and the target main chain account includes a first main chain account and a second main chain account; and changing the status of the contract status data of the target main chain account in response to the transaction data belonging to the second transaction service type includes, in response to the transaction data belonging to the transfer service type:
  subtracting the target transfer status data from the contract status data of the first main chain account; and
  adding the contract status data of the second main chain account and the target transfer status data.

16. The method according to claim 12, further comprising:
  receiving a contract address creation request, transmitted by a service node, for the target main chain account;
  creating, according to the contract address creation request, a contract address bound to the target main chain account in the resource locking contract as a target contract address for storing the contract status data of the target main chain account; and
  generating an account address creation request to the relay node according to the contract address creation request, to enable the relay node to create, according to the account address creation request, a sub-chain account address bound to the target sub-chain account in the sub-blockchain network and for storing the status data of the target sub-chain account.

17. A computer device comprising:
one or more processors; and
one or more memories storing one or more computer programs that, when executed by the one or more processors, cause the one or more processors to perform the method according claim 12.

18. The computer device according to claim 17, wherein:
the first transaction service type is a storage service type, and the status change information includes the target main chain account for executing a storage service and target storage status data; and
the one or more computer programs further cause the one or more processors to, in response to the transaction data belonging to the storage service type:
  obtain a virtual resource corresponding to the target storage status data from the on-chain virtual resources corresponding to the target main chain account as a storage virtual resource;
  transfer the storage virtual resource to the resource locking contract for locking;
  subtract the target storage status data from the on-chain status data; and
  add the contract status data and the target storage status data.

19. The computer device according to claim 17, wherein:
the first transaction service type is an extraction service type, and the status change information includes the target main chain account for executing an extraction service and target extraction status data; and
the one or more computer programs further cause the one or more processors to, in response to the transaction data belonging to the extraction service type:
  obtain a virtual resource corresponding to the target extraction status data from the contract virtual resources corresponding to the target main chain account as an extraction virtual resource;
  transfer the extraction virtual resource out of the resource locking contract;
  add the on-chain status data and the target extraction status data; and
  subtract the target extraction status data from the contract status data.

20. A non-transitory computer-readable storage medium storing one or more computer programs that, when executed by one or more processors, cause the one or more processors to perform the method according to claim 12.

* * * * *